United States Patent
Thomas

(10) Patent No.: US 12,514,864 B2
(45) Date of Patent: Jan. 6, 2026

(54) COMPOSITIONS AND METHODS FOR ORAL ADMINISTRATION OF CANNABINOIDS

(71) Applicant: NATURAL EXTRACTION SYSTEMS, LLC, Boulder, CO (US)

(72) Inventor: C. Russell Thomas, Boulder, CO (US)

(73) Assignee: Natural Extraction Systems, LLC, Boulder, CO (US)

( * ) Notice: Subject to any disclaimer, the term of this patent is extended or adjusted under 35 U.S.C. 154(b) by 649 days.

(21) Appl. No.: 17/751,409

(22) Filed: May 23, 2022

(65) Prior Publication Data

US 2022/0370402 A1    Nov. 24, 2022

Related U.S. Application Data

(60) Provisional application No. 63/254,437, filed on Oct. 11, 2021, provisional application No. 63/194,815, filed on May 28, 2021, provisional application No. 63/191,818, filed on May 21, 2021, provisional application No. 63/191,836, filed on May 21, 2021, provisional application No. 63/191,880, filed on May 21, 2021, provisional application No. 63/191,849, filed on May 21, 2021.

(51) Int. Cl.
| | |
|---|---|
| *A61K 31/05* | (2006.01) |
| *A61K 9/00* | (2006.01) |
| *A61K 31/00* | (2006.01) |
| *A61K 31/352* | (2006.01) |
| *A61K 31/538* | (2006.01) |
| *A61K 47/10* | (2017.01) |

(52) U.S. Cl.
CPC .......... *A61K 31/352* (2013.01); *A61K 9/0053* (2013.01); *A61K 31/05* (2013.01); *A61K 31/538* (2013.01); *A61K 47/10* (2013.01)

(58) Field of Classification Search
CPC ..... A61K 31/05; A61K 31/658; A61K 9/0053
See application file for complete search history.

(56) References Cited

U.S. PATENT DOCUMENTS 10,932,497 B2 * 3/2021 Lopez .................. A24B 15/303

FOREIGN PATENT DOCUMENTS

WO    WO-2020167892 A1 *  8/2020  ............. A61K 47/10

* cited by examiner

*Primary Examiner* — Sikarl A Witherspoon
(74) *Attorney, Agent, or Firm* — Douglas G. Metcalf

(57) ABSTRACT

Various aspects of this disclosure relate to a composition, comprising a liquid phase that consists of chemical species that comprise a solvent and solutes, wherein: each solute of the solutes is dissolved in the solvent of the liquid phase; each chemical species of the liquid phase has a concentration by mass in the liquid phase; the concentration by mass of the solvent in the liquid phase is greater than the concentration by mass of each solute of the liquid phase; the solvent is glycerol; the solutes comprise a cannabinoid; the liquid phase has a pressure and temperature; the cannabinoid has a solubility in glycerol at the pressure and temperature; the concentration by mass of the cannabinoid in the liquid phase is greater than the solubility of the cannabinoid in glycerol at the pressure and temperature; the composition is formulated for oral consumption; and the composition comprises at least 0.1 and no greater than 6 food calories per gram of the composition.

20 Claims, No Drawings

COMPOSITIONS AND METHODS FOR ORAL ADMINISTRATION OF CANNABINOIDS

CROSS-REFERENCE TO RELATED APPLICATIONS

This patent application claims priority to U.S. Provisional Patent Application No. 63/191,818, filed May 21, 2021; U.S. Provisional Patent Application No. 63/191,836, filed May 21, 2021; U.S. Provisional Patent Application No. 63/191,849, filed May 21, 2021; U.S. Provisional Patent Application No. 63/191,880, filed May 21, 2021; U.S. Provisional Patent Application No. 63/194,815, filed May 28, 2021; U.S. Provisional Patent Application No. 63/254,437, filed Oct. 11, 2021, each of which is incorporated by reference in its entirety.

BACKGROUND

The inhalation of cannabis smoke and vapor is challenging to titrate, which often results in over-consumption and a corresponding undesirable level of intoxication. The oral consumption of cannabis generally displays delayed and variable pharmacokinetics, which results in an unpredictable level of intoxication that also often results in over-consumption. Cannabis formulations that allow users to titrate their dose with predictable pharmacokinetics and predictable levels of intoxication are desirable.

BRIEF DESCRIPTION

Cannabinoids are generally insoluble in glycerol. Various aspects of this disclosure relate to the discovery that cannabinoids will nevertheless dissolve in glycerol in the presence of one or both of ethanol and propylene glycol. Various aspects of this disclosure relate to the discovery that the pharmacokinetics of an orally-administered cannabinoid improve when the cannabinoid is dissolved in glycerol. Without limiting any aspect of this disclosure, an orally-administered cannabinoid dissolved in glycerol rapidly loses solubility as water from the mouth and gastrointestinal tract enter the glycerol, which results in the rapid phase separation of the cannabinoid from the glycerol. This rapid phase separation results in the cannabinoid adhering to the epithelium of the gastrointestinal tract, which improves the pharmacokinetics of the cannabinoid as it enters the blood from the epithelium. This absorption mechanism notably also bypasses liver metabolism.

The oral administration of cannabinoids in glycerol also improves the caloric profile of a cannabinoid formulation. The triglyceride-based cannabinoid formulation EPIDIOLEX® has a high caloric profile. In preferred embodiments, the compositions of this disclosure lack triglycerides and other lipids at high concentrations such as greater than 20 percent because triglycerides interfere with the pharmacokinetic improvement described in the preceding paragraph and because triglycerides are calorie dense. In some embodiments, the compositions of this disclosure lack triglycerides and other lipids at a concentration greater than 10 percent, 5 percent, 2 percent, or 1 percent. In some embodiments, the compositions of this disclosure are essentially free of triglycerides and other lipids except for trace triglycerides and other lipids that cannot be cost-effectively removed during commercial manufacturing and/or any triglycerides and other lipids that an infringer of patent claims that mature from this disclosure might incorporate into a formulation to avoid infringement of a resultant patent.

In commercial embodiments, a composition comprises at least 50 percent glycerol, no greater than 30 percent ethanol, no greater than 30 percent propylene glycol, and water. Such compositions can be delivered as an oral spray, which maximizes the surface area of the liquid to increase the rate at which a cannabinoid loses solubility in the glycerol and partitions out of the glycerol and into the epithelium. A THC spray can contain a volume of about 150 microliters (about 150 milligrams of liquid) that contains 1 milligram of THC, which allows for precise dosing. The rapid pharmacokinetics of the formulation allow consumers to precisely titrate their dose and achieve predictable, desirable levels of intoxication. While this paragraph describes a general formulation for a THC spray, the skilled person will be able to develop other formulations by varying the concentrations of ingredients as set forth in the detailed description that follows using no more than routine experimentation. The skilled person may desire to reduce or remove ethanol or propylene glycol from a formulation, for example, which requires routine experimentation to adjust other ingredients. The skilled person may similarly desire to change the volume of a spray such as within a range of 50 to 250 microliters and/or change the amount of the cannabinoid in the spray such as from 1 milligram to 0.5 milligrams, and the detailed description that follows captures workable ranges for such adjustments. Other cannabinoids are relevant to the formulations of this disclosure including pharmaceutically-relevant cannabinoids for use in treating health conditions.

A guiding principle of this disclosure is the development of formulations in which a cannabinoid is dissolved in a composition at a greater concentration than its solubility in glycerol, which allows for improved pharmacokinetics. An additional consideration is the development of formulations containing low calorie-to-gram ratios and low calorie-to-cannabinoid ratios, which improve consumer interest relative to higher-calorie cannabinoid products, and which was irrelevant during the development of inhaled products such as vape oil and unappreciated during the development of cannabinoid pharmaceuticals such as EPIDIOLEX®.

Various aspects of this disclosure relate to a composition, comprising a liquid phase that consists of chemical species that comprise a solvent and solutes, wherein: each solute of the solutes is dissolved in the solvent of the liquid phase; each chemical species of the liquid phase has a concentration by mass in the liquid phase; the concentration by mass of the solvent in the liquid phase is greater than the concentration by mass of each solute of the liquid phase; the solvent is glycerol; the solutes comprise a cannabinoid; the liquid phase has a pressure and temperature; the cannabinoid has a solubility in glycerol at the pressure and temperature; the concentration by mass of the cannabinoid in the liquid phase is greater than the solubility of the cannabinoid in glycerol at the pressure and temperature; the composition is formulated for oral consumption; and the composition comprises at least 0.1 and no greater than 6 food calories per gram of the composition.

In some embodiments, the concentration of the cannabinoid in the liquid phase is at least 0.1 percent and no greater than 4 percent by mass.

In some embodiments, the concentration of the glycerol in the liquid phase is at least 35 percent and no greater than greater 90 by mass.

In some embodiments, the concentration of the cannabinoid in the liquid phase is at least 100 times greater than the solubility of the cannabinoid in glycerol at the pressure and temperature.

In some embodiments, the liquid phase comprises propylene glycol at a concentration of at least 5 percent and no greater than 20 percent by mass; and the propylene glycol is a solute that is dissolved in the glycerol.

In some embodiments, the liquid phase lacks propylene glycol.

In some embodiments, the liquid phase comprises ethanol at a concentration of at least 5 percent and no greater than 35 percent by mass; and the ethanol is a solute that is dissolved in the glycerol.

In some embodiments, the liquid phase lacks ethanol.

In some embodiments, the liquid phase comprises water at a concentration of at least 5 parts per million and no greater than 15 percent by mass; and the water is a solute that is dissolved in the glycerol.

In some embodiments, the liquid phase lacks water.

In some embodiments, the cannabinoid is tetrahydrocannabinol.

In some embodiments, the liquid phase comprises the glycerol at a concentration of at least 45 percent and no greater than 65 percent by mass; the liquid phase comprises propylene glycol at a concentration of at least 5 percent and no greater than 20 percent by mass; the liquid phase comprises ethanol at a concentration of at least 5 percent and no greater than 35 percent by mass; the liquid phase comprises water at a concentration of at least of at least 5 parts per million and no greater than 15 percent by mass; and the liquid phase comprises the cannabinoid at a concentration of at least 0.2 percent and no greater than 2 percent by mass.

In some embodiments, the liquid phase is a dispersed phase; the gas phase is a dispersion medium; the liquid phase is suspended in the gas phase; the composition comprises at least 40 milligrams and no greater than 300 milligrams of the liquid phase; the composition comprises at least 0.16 and no greater than 1.8 food calories; and the composition is a spray.

In some embodiments, the composition comprises at least 0.48 and no greater than 2.1 milligrams of the cannabinoid.

In some embodiments, the composition is an aerosol.

Various aspects of this disclosure relate to a container, comprising a chamber that contains the composition as described anywhere in this disclosure, wherein: the liquid phase of the composition comprises at least 2 milligrams and no greater than 110 milligrams of the cannabinoid; the container is configured to dispense at least 3 and no greater than 110 metered portions of the liquid phase from the container; the metered portions have (a) an average mass of at least 40 milligrams and no greater than 300 milligrams of the liquid phase; (b) an average amount of food calories of at least 0.16 and no greater than 1.8 food calories; and (c) an average dose of the cannabinoid of at least 0.4 milligrams and no greater than 3 milligrams; and the metered portions have (a) a standard deviation of no greater than 20 percent of the average mass of the liquid phase; (b) a standard deviation of no greater than 20 percent of the average amount of food calories; and (c) a standard deviation of no greater than 20 percent of the average dose of the cannabinoid.

In some embodiments, the container is configured to dispense a spray of the liquid phase.

Various aspects of this disclosure relate to a method to administer a cannabinoid to a subject, comprising providing the composition as described anywhere in this disclosure; and spraying a portion of the composition into the mouth of the subject.

In some embodiments, the administering produces a T max, which is the time it takes to achieve a maximum blood concentration of the cannabinoid in the subject following the administering; and the T max is no greater than 10 minutes.

In some embodiments, the portion of the composition comprises an administered amount of the cannabinoid; the subject has blood; a bioavailable amount of the cannabinoid enters the blood of the subject following the administering; the composition has an oral bioavailability, which is equal to the bioavailable amount divided by the administered amount; and the oral bioavailability is at least 25 percent.

DETAILED DESCRIPTION

Various aspects of this disclosure relate to a composition, comprising a liquid phase that consists of chemical species that comprise a solvent and solutes, wherein: each solute of the solutes is dissolved in the solvent of the liquid phase; each chemical species of the liquid phase has a concentration by mass in the liquid phase; the concentration by mass of the solvent in the liquid phase is greater than the concentration by mass of each solute of the liquid phase; the solvent is glycerol; the solutes comprise a cannabinoid; the liquid phase has a pressure and temperature; the cannabinoid has a solubility in glycerol at the pressure and temperature; the concentration by mass of the cannabinoid in the liquid phase is greater than the solubility of the cannabinoid in glycerol at the pressure and temperature; the composition is formulated for oral consumption; and the composition comprises at least 0.1 and no greater than 6 food calories per gram of the composition.

In some embodiments, the concentration by mass of the cannabinoid in the liquid phase is at least 2 times greater than the solubility of the cannabinoid in glycerol at the pressure and temperature. In some embodiments, the concentration by mass of the cannabinoid in the liquid phase is at least 4 times greater than the solubility of the cannabinoid in glycerol at the pressure and temperature. In some embodiments, the concentration by mass of the cannabinoid in the liquid phase is at least 8 times greater than the solubility of the cannabinoid in glycerol at the pressure and temperature. In some embodiments, the concentration by mass of the cannabinoid in the liquid phase is at least 16 times greater than the solubility of the cannabinoid in glycerol at the pressure and temperature. In some embodiments, the concentration by mass of the cannabinoid in the liquid phase is at least 32 times greater than the solubility of the cannabinoid in glycerol at the pressure and temperature. In some embodiments, the concentration by mass of the cannabinoid in the liquid phase is at least 64 times greater than the solubility of the cannabinoid in glycerol at the pressure and temperature. In some embodiments, the concentration by mass of the cannabinoid in the liquid phase is at least 128 times greater than the solubility of the cannabinoid in glycerol at the pressure and temperature. In some embodiments, the concentration by mass of the cannabinoid in the liquid phase is at least 256 times greater than the solubility of the cannabinoid in glycerol at the pressure and temperature. In some embodiments, the concentration by mass of the cannabinoid in the liquid phase is at least 512 times greater than the solubility of the cannabinoid in glycerol at the pressure and temperature. In some embodiments, the concentration by mass of the cannabinoid in the liquid phase is at least 1024 times greater than the solubility of the cannabinoid in glycerol at the pressure and temperature.

In some embodiments, the composition comprises at least 0.2 food calories per gram of the composition. In some embodiments, the composition comprises at least 0.4 food calories per gram of the composition. In some embodiments, the composition comprises at least 0.6 food calories per gram of the composition. In some embodiments, the composition comprises at least 0.8 food calories per gram of the composition. In some embodiments, the composition comprises at least 1.0 food calories per gram of the composition. In some embodiments, the composition comprises at least 1.2 food calories per gram of the composition. In some embodiments, the composition comprises at least 1.4 food calories per gram of the composition. In some embodiments, the composition comprises at least 1.6 food calories per gram of the composition. In some embodiments, the composition comprises at least 1.8 food calories per gram of the composition. In some embodiments, the composition comprises at least 2.0 food calories per gram of the composition. In some embodiments, the composition comprises at least 2.2 food calories per gram of the composition. In some embodiments, the composition comprises at least 2.4 food calories per gram of the composition. In some embodiments, the composition comprises at least 2.6 food calories per gram of the composition. In some embodiments, the composition comprises at least 2.8 food calories per gram of the composition. In some embodiments, the composition comprises at least 3.0 food calories per gram of the composition. In some embodiments, the composition comprises at least 3.2 food calories per gram of the composition. In some embodiments, the composition comprises at least 3.4 food calories per gram of the composition. In some embodiments, the composition comprises at least 3.6 food calories per gram of the composition. In some embodiments, the composition comprises at least 3.8 food calories per gram of the composition. In some embodiments, the composition comprises at least 4.0 food calories per gram of the composition. In some embodiments, the composition comprises at least 4.2 food calories per gram of the composition. In some embodiments, the composition comprises at least 4.4 food calories per gram of the composition. In some embodiments, the composition comprises at least 4.6 food calories per gram of the composition. In some embodiments, the composition comprises at least 4.8 food calories per gram of the composition. In some embodiments, the composition comprises at least 5.0 food calories per gram of the composition. In some embodiments, the composition comprises at least 5.2 food calories per gram of the composition. In some embodiments, the composition comprises at least 5.4 food calories per gram of the composition.

"Food calories" refer to calories as reported on a United States food nutrition label.

In some embodiments, the composition comprises no greater than 5.8 food calories per gram of the composition. In some embodiments, the composition comprises no greater than 5.6 food calories per gram of the composition. In some embodiments, the composition comprises no greater than 5.4 food calories per gram of the composition. In some embodiments, the composition comprises no greater than 5.2 food calories per gram of the composition. In some embodiments, the composition comprises no greater than 5.0 food calories per gram of the composition. In some embodiments, the composition comprises no greater than 4.8 food calories per gram of the composition. In some embodiments, the composition comprises no greater than 4.6 food calories per gram of the composition. In some embodiments, the composition comprises no greater than 4.4 food calories per gram of the composition. In some embodiments, the composition comprises no greater than 4.2 food calories per gram of the composition. In some embodiments, the composition comprises no greater than 4.0 food calories per gram of the composition. In some embodiments, the composition comprises no greater than 3.8 food calories per gram of the composition.

In some embodiments, at least 30 percent of the food calories of the composition are derived from the glycerol. In some embodiments, at least 35 percent of the food calories of the composition are derived from the glycerol. In some embodiments, at least 40 percent of the food calories of the composition are derived from the glycerol. In some embodiments, at least 45 percent of the food calories of the composition are derived from the glycerol. In some embodiments, at least 50 percent of the food calories of the composition are derived from the glycerol. In some embodiments, at least 55 percent of the food calories of the composition are derived from the glycerol. In some embodiments, at least 60 percent of the food calories of the composition are derived from the glycerol.

In some embodiments, no greater than 65 percent of the food calories of the composition are derived from the glycerol. In some embodiments, no greater than 60 percent of the food calories of the composition are derived from the glycerol. In some embodiments, no greater than 55 percent of the food calories of the composition are derived from the glycerol. In some embodiments, no greater than 50 percent of the food calories of the composition are derived from the glycerol. In some embodiments, no greater than 45 percent of the food calories of the composition are derived from the glycerol. In some embodiments, no greater than 40 percent of the food calories of the composition are derived from the glycerol. In some embodiments, no greater than 35 percent of the food calories of the composition are derived from the glycerol.

In some embodiments, the concentration of the cannabinoid in the liquid phase is at least 0.1 percent by mass. In some embodiments, the concentration of the cannabinoid in the liquid phase is at least 0.2 percent by mass. In some embodiments, the concentration of the cannabinoid in the liquid phase is at least 0.4 percent by mass. In some embodiments, the concentration of the cannabinoid in the liquid phase is at least 0.6 percent by mass. In some embodiments, the concentration of the cannabinoid in the liquid phase is at least 0.8 percent by mass. In some embodiments, the concentration of the cannabinoid in the liquid phase is at least 1.0 percent by mass. In some embodiments, the concentration of the cannabinoid in the liquid phase is at least 1.2 percent by mass. In some embodiments, the concentration of the cannabinoid in the liquid phase is at least 1.4 percent by mass. In some embodiments, the concentration of the cannabinoid in the liquid phase is at least 1.6 percent by mass. In some embodiments, the concentration of the cannabinoid in the liquid phase is at least 1.8 percent by mass. In some embodiments, the concentration of the cannabinoid in the liquid phase is at least 2.0 percent by mass.

In some embodiments, the concentration of the cannabinoid in the liquid phase is no greater than 4.0 percent by mass. In some embodiments, the concentration of the cannabinoid in the liquid phase is no greater than 3.8 percent by mass. In some embodiments, the concentration of the cannabinoid in the liquid phase is no greater than 3.6 percent by mass. In some embodiments, the concentration of the cannabinoid in the liquid phase is no greater than 3.4 percent by mass. In some embodiments, the concentration of the cannabinoid in the liquid phase is no greater than 3.2 percent by mass. In some embodiments, the concentration of the cannabinoid in the liquid phase is no greater than 3.0 percent by mass. In some embodiments, the concentration of the cannabinoid in the liquid phase is no greater than 2.8 percent by mass. In some embodiments, the concentration of the cannabinoid in the liquid phase is no greater than 2.6 percent by mass. In some embodiments, the concentration of the cannabinoid in the liquid phase is no greater than 2.4 percent by mass. In some embodiments, the concentration of the cannabinoid in the liquid phase is no greater than 2.2 percent by mass. In some embodiments, the concentration of the cannabinoid in the liquid phase is no greater than 2.0 percent by mass. In some embodiments, the concentration of the cannabinoid in the liquid phase is no greater than 1.8 percent by mass. In some embodiments, the concentration of the cannabinoid in the liquid phase is no greater than 1.6 percent by mass. In some embodiments, the concentration of the cannabinoid in the liquid phase is no greater than 1.4 percent by mass. In some embodiments, the concentration of the cannabinoid in the liquid phase is no greater than 1.2 percent by mass. In some embodiments, the concentration of the cannabinoid in the liquid phase is no greater than 1.0 percent by mass. In some embodiments, the concentration of the cannabinoid in the liquid phase is no greater than 0.8 percent by mass.

In some embodiments, the concentration of the glycerol in the liquid phase is at least 35 percent by mass. In some embodiments, the concentration of the glycerol in the liquid phase is at least 40 percent by mass. In some embodiments, the concentration of the glycerol in the liquid phase is at least 45 percent by mass. In some embodiments, the concentration of the glycerol in the liquid phase is at least 50 percent by mass. In some embodiments, the concentration of the glycerol in the liquid phase is at least 55 percent by mass. In some embodiments, the concentration of the glycerol in the liquid phase is at least 60 percent by mass. In some embodiments, the concentration of the glycerol in the liquid phase is at least 65 percent by mass. In some embodiments, the concentration of the glycerol in the liquid phase is at least 70 percent by mass. In some embodiments, the concentration of the glycerol in the liquid phase is at least 75 percent by mass. In some embodiments, the concentration of the glycerol in the liquid phase is at least 80 percent by mass. In some embodiments, the concentration of the glycerol in the liquid phase is at least 85 percent by mass. In some embodiments, the concentration of the glycerol in the liquid phase is at least 90 percent by mass.

In some embodiments, the concentration of the glycerol in the liquid phase is no greater than 95 percent by mass. In some embodiments, the concentration of the glycerol in the liquid phase is no greater than 90 percent by mass. In some embodiments, the concentration of the glycerol in the liquid phase is no greater than 85 percent by mass. In some embodiments, the concentration of the glycerol in the liquid phase is no greater than 80 percent by mass. In some embodiments, the concentration of the glycerol in the liquid phase is no greater than 75 percent by mass. In some embodiments, the concentration of the glycerol in the liquid phase is no greater than 70 percent by mass. In some embodiments, the concentration of the glycerol in the liquid phase is no greater than 65 percent by mass. In some embodiments, the concentration of the glycerol in the liquid phase is no greater than 60 percent by mass. In some embodiments, the concentration of the glycerol in the liquid phase is no greater than 55 percent by mass. In some embodiments, the concentration of the glycerol in the liquid phase is no greater than 50 percent by mass. In some embodiments, the concentration of the glycerol in the liquid phase is no greater than 45 percent by mass. In some embodiments, the concentration of the glycerol in the liquid phase is no greater than 40 percent by mass.

In some embodiments, the solutes of the liquid phase comprise one or both of 1,3-dihydroxypropane-2-oxide and 2,3-dihydroxypropane-1-oxide, which are dissolved in the glycerol of the liquid phase.

In some embodiments, the liquid phase comprises the glycerol and the one or both of 1,3-dihydroxypropane-2-oxide and 2,3-dihydroxypropane-1-oxide at a molar ratio of at least 1,000:1 (glycerol: 1,3-dihydroxypropane-2-oxide and 2,3-dihydroxypropane-1-oxide). In some embodiments, the liquid phase comprises the glycerol and the one or both of 1,3-dihydroxypropane-2-oxide and 2,3-dihydroxypropane-1-oxide at a molar ratio of at least 5,000:1. In some embodiments, the liquid phase comprises the glycerol and the one or both of 1,3-dihydroxypropane-2-oxide and 2,3-dihydroxypropane-1-oxide at a molar ratio of at least 10,000:1. In some embodiments, the liquid phase comprises the glycerol and the one or both of 1,3-dihydroxypropane-2-oxide and 2,3-dihydroxypropane-1-oxide at a molar ratio of at least 50,000:1. In some embodiments, the liquid phase comprises the glycerol and the one or both of 1,3-dihydroxypropane-2-oxide and 2,3-dihydroxypropane-1-oxide at a molar ratio of at least 100,000:1. In some embodiments, the liquid phase comprises the glycerol and the one or both of 1,3-dihydroxypropane-2-oxide and 2,3-dihydroxypropane-1-oxide at a molar ratio of at least 500,000:1. In some embodiments, the liquid phase comprises the glycerol and the one or both of 1,3-dihydroxypropane-2-oxide and 2,3-dihydroxypropane-1-oxide at a molar ratio of at least 1,000,000:1. In some embodiments, the liquid phase comprises the glycerol and the one or both of 1,3-dihydroxypropane-2-oxide and 2,3-dihydroxypropane-1-oxide at a molar ratio of at least 5,000,000:1. In some embodiments, the liquid phase comprises the glycerol and the one or both of 1,3-dihydroxypropane-2-oxide and 2,3-dihydroxypropane-1-oxide at a molar ratio of at least 10,000,000:1. In some embodiments, the liquid phase comprises the glycerol and the one or both of 1,3-dihydroxypropane-2-oxide and 2,3-dihydroxypropane-1-oxide at a molar ratio of at least 50,000,000:1. In some embodiments, the liquid phase comprises the glycerol and the one or both of 1,3-dihydroxypropane-2-oxide and 2,3-dihydroxypropane-1-oxide at a molar ratio of at least 100,000,000:1. In some embodiments, the liquid phase comprises the glycerol and the one or both of 1,3-dihydroxypropane-2-oxide and 2,3-dihydroxypropane-1-oxide at a molar ratio of at least 500,000,000:1. In some embodiments, the liquid phase comprises the glycerol and the one or both of 1,3-dihydroxypropane-2-oxide and 2,3-dihydroxypropane-1-oxide at a molar ratio of at least 1,000,000,000:1. In some embodiments, the liquid phase comprises the glycerol and the one or both of 1,3-dihydroxypropane-2-oxide and 2,3-dihydroxypropane-1-oxide at a molar ratio of at least 5,000,000,000:1. In some embodiments, the liquid phase comprises the glycerol and the one or both of 1,3-dihydroxypropane-2-oxide and 2,3-dihydroxypropane-1-oxide at a molar ratio of at least 10,000,000,000:1.

In some embodiments, the liquid phase comprises the glycerol and the one or both of 1,3-dihydroxypropane-2-oxide and 2,3-dihydroxypropane-1-oxide at a molar ratio of no greater than 1,000,000,000,000:1 (glycerol: 1,3-dihydroxypropane-2-oxide and 2,3-dihydroxypropane-1-oxide). In some embodiments, the liquid phase comprises the glycerol and the one or both of 1,3-dihydroxypropane-2-oxide and 2,3-dihydroxypropane-1-oxide at a molar ratio of no greater than 500,000,000,000:1. In some embodiments, the liquid phase comprises the glycerol and the one or both of 1,3-dihydroxypropane-2-oxide and 2,3-dihydroxypropane-1-oxide at a molar ratio of no greater than 100,000,000,000:1. In some embodiments, the liquid phase comprises the glycerol and the one or both of 1,3-dihydroxypropane-2-oxide and 2,3-dihydroxypropane-1-oxide at a molar ratio of no greater than 50,000,000,000:1. In some embodiments, the liquid phase comprises the glycerol and the one or both of 1,3-dihydroxypropane-2-oxide and 2,3-dihydroxypropane-1-oxide at a molar ratio of no greater than 10,000,000,000:1. In some embodiments, the liquid phase comprises the glycerol and the one or both of 1,3-dihydroxypropane-2-oxide and 2,3-dihydroxypropane-1-oxide at a molar ratio of no greater than 5,000,000,000:1. In some embodiments, the liquid phase comprises the glycerol and the one or both of 1,3-dihydroxypropane-2-oxide and 2,3-dihydroxypropane-1-oxide at a molar ratio of no greater than 1,000,000,000:1. In some embodiments, the liquid phase comprises the glycerol and the one or both of 1,3-dihydroxypropane-2-oxide and 2,3-dihydroxypropane-1-oxide at a molar ratio of no greater than 500,000,000:1. In some embodiments, the liquid phase comprises the glycerol and the one or both of 1,3-dihydroxypropane-2-oxide and 2,3-dihydroxypropane-1-oxide at a molar ratio of no greater than 100,000,000:1. In some embodiments, the liquid phase comprises the glycerol and the one or both of 1,3-dihydroxypropane-2-oxide and 2,3-dihydroxypropane-1-oxide at a molar ratio of no greater than 50,000,000:1. In some embodiments, the liquid phase comprises the glycerol and the one or both of 1,3-dihydroxypropane-2-oxide and 2,3-dihydroxypropane-1-oxide at a molar ratio of no greater than 10,000,000:1. In some embodiments, the liquid phase comprises the glycerol and the one or both of 1,3-dihydroxypropane-2-oxide and 2,3-dihydroxypropane-1-oxide at a molar ratio of no greater than 5,000,000:1. In some embodiments, the liquid phase comprises the glycerol and the one or both of 1,3-dihydroxypropane-2-oxide and 2,3-dihydroxypropane-1-oxide at a molar ratio of no greater than 1,000,000:1. In some embodiments, the liquid phase comprises the glycerol and the one or both of 1,3-dihydroxypropane-2-oxide and 2,3-dihydroxypropane-1-oxide at a molar ratio of no greater than 500,000:1. In some embodiments, the liquid phase comprises the glycerol and the one or both of 1,3-dihydroxypropane-2-oxide and 2,3-dihydroxypropane-1-oxide at a molar ratio of no greater than 100,000:1. In some embodiments, the liquid phase comprises the glycerol and the one or both of 1,3-dihydroxypropane-2-oxide and 2,3-dihydroxypropane-1-oxide at a molar ratio of no greater than 50,000:1.

In some embodiments, the solutes of the liquid phase comprise propylene glycol; and the propylene glycol is dissolved in the glycerol of the liquid phase.

In some embodiments, the concentration of the propylene glycol in the liquid phase is at least 1 percent by mass. In some embodiments, the concentration of the propylene glycol in the liquid phase is at least 5 percent by mass. In some embodiments, the concentration of the propylene glycol in the liquid phase is at least 10 percent by mass. In some embodiments, the concentration of the propylene glycol in the liquid phase is at least 15 percent by mass. In some embodiments, the concentration of the propylene glycol in the liquid phase is at least 20 percent by mass. In some embodiments, the concentration of the propylene glycol in the liquid phase is at least 25 percent by mass. In some embodiments, the concentration of the propylene glycol in the liquid phase is at least 30 percent by mass. In some embodiments, the concentration of the propylene glycol in the liquid phase is at least 35 percent by mass. In some embodiments, the concentration of the propylene glycol in the liquid phase is no greater than 40 percent by mass. In some embodiments, the concentration of the propylene glycol in the liquid phase is no greater than 35 percent by mass. In some embodiments, the concentration of the propylene glycol in the liquid phase is no greater than 30 percent by mass. In some embodiments, the concentration of the propylene glycol in the liquid phase is no greater than 25 percent by mass. In some embodiments, the concentration of the propylene glycol in the liquid phase is no greater than 20 percent by mass. In some embodiments, the concentration of the propylene glycol in the liquid phase is no greater than 15 percent by mass. In some embodiments, the concentration of the propylene glycol in the liquid phase is no greater than 10 percent by mass. In some embodiments, the concentration of the propylene glycol in the liquid phase is no greater than 5 percent by mass.

In some embodiments, the liquid phase lacks propylene glycol at a concentration greater than 500 parts per million by mass. In some embodiments, the liquid phase lacks propylene glycol at a concentration greater than 100 parts per million by mass. In some embodiments, the liquid phase lacks propylene glycol at a concentration greater than 50 parts per million by mass. In some embodiments, the liquid phase lacks propylene glycol at a concentration greater than 10 parts per million by mass. In some embodiments, the liquid phase lacks propylene glycol at a concentration greater than 5 parts per million by mass. In some embodiments, the liquid phase lacks propylene glycol at a concentration greater than 1 part per million by mass.

In some embodiments, the solutes of the liquid phase comprise one or both of 1-hydroxypropane-2-oxide and 2-hydroxypropane-1-oxide, which are dissolved in the glycerol of the liquid phase.

In some embodiments, the liquid phase comprises the propylene glycol and the one or both of 1-hydroxypropane-2-oxide and 2-hydroxypropane-1-oxide at a molar ratio of at least 1,000:1 (propylene glycol: 1-hydroxypropane-2-oxide and 2-hydroxypropane-1-oxide). In some embodiments, the liquid phase comprises the propylene glycol and the one or both of 1-hydroxypropane-2-oxide and 2-hydroxypropane-1-oxide at a molar ratio of at least 5,000:1. In some embodiments, the liquid phase comprises the propylene glycol and the one or both of 1-hydroxypropane-2-oxide and 2-hydroxypropane-1-oxide at a molar ratio of at least 10,000:1. In some embodiments, the liquid phase comprises the propylene glycol and the one or both of 1-hydroxypropane-2-oxide and 2-hydroxypropane-1-oxide at a molar ratio of at least 50,000:1. In some embodiments, the liquid phase comprises the propylene glycol and the one or both of 1-hydroxypropane-2-oxide and 2-hydroxypropane-1-oxide at a molar ratio of at least 100,000:1. In some embodiments, the liquid phase comprises the propylene glycol and the one or both of 1-hydroxypropane-2-oxide and 2-hydroxypropane-1-oxide at a molar ratio of at least 500,000:1. In some embodiments, the liquid phase comprises the propylene glycol and the one or both of 1-hydroxypropane-2-oxide and 2-hydroxypropane-1-oxide at a molar ratio of at least 1,000,000:1. In some embodiments, the liquid phase comprises the propylene glycol and the one or both of 1-hydroxypropane-2-oxide and 2-hydroxypropane-1-oxide at a molar ratio of at least 5,000,000:1. In some embodiments, the liquid phase comprises the propylene glycol and the one or both of 1-hydroxypropane-2-oxide and 2-hydroxypropane-1-oxide at a molar ratio of at least 10,000,000:1. In some embodiments, the liquid phase comprises the propylene glycol and the one or both of 1-hydroxypropane-2-oxide and 2-hydroxypropane-1-oxide at a molar ratio of at least 50,000,000:1. In some embodiments, the liquid phase comprises the propylene glycol and the one or both of 1-hydroxypropane-2-oxide and 2-hydroxypropane-1-oxide at a molar ratio of at least 100,000,000:1. In some embodiments, the liquid phase comprises the propylene glycol and the one or both of 1-hydroxypropane-2-oxide and 2-hydroxypropane-1-oxide at a molar ratio of at least 500,000,000:1. In some embodiments, the liquid phase comprises the propylene glycol and the one or both of 1-hydroxypropane-2-oxide and 2-hydroxypropane-1-oxide at a molar ratio of at least 1,000,000,000:1. In some embodiments, the liquid phase comprises the propylene glycol and the one or both of 1-hydroxypropane-2-oxide and 2-hydroxypropane-1-oxide at a molar ratio of at least 5,000,000,000:1. In some embodiments, the liquid phase comprises the propylene glycol and the one or both of 1-hydroxypropane-2-oxide and 2-hydroxypropane-1-oxide at a molar ratio of at least 10,000,000,000:1.

In some embodiments, the liquid phase comprises the propylene glycol and the one or both of 1-hydroxypropane-2-oxide and 2-hydroxypropane-1-oxide at a molar ratio of at least 1,000,000,000,000:1 (propylene glycol: 1-hydroxypropane-2-oxide and 2-hydroxypropane-1-oxide). In some embodiments, the liquid phase comprises the propylene glycol and the one or both of 1-hydroxypropane-2-oxide and 2-hydroxypropane-1-oxide at a molar ratio of no greater than 500,000,000,000:1. In some embodiments, the liquid phase comprises the propylene glycol and the one or both of 1-hydroxypropane-2-oxide and 2-hydroxypropane-1-oxide at a molar ratio of no greater than 100,000,000,000:1. In some embodiments, the liquid phase comprises the propylene glycol and the one or both of 1-hydroxypropane-2-oxide and 2-hydroxypropane-1-oxide at a molar ratio of no greater than 50,000,000,000:1. In some embodiments, the liquid phase comprises the propylene glycol and the one or both of 1-hydroxypropane-2-oxide and 2-hydroxypropane-1-oxide at a molar ratio of no greater than 10,000,000,000:1. In some embodiments, the liquid phase comprises the propylene glycol and the one or both of 1-hydroxypropane-2-oxide and 2-hydroxypropane-1-oxide at a molar ratio of no greater than 5,000,000,000:1. In some embodiments, the liquid phase comprises the propylene glycol and the one or both of 1-hydroxypropane-2-oxide and 2-hydroxypropane-1-oxide at a molar ratio of no greater than 1,000,000,000:1. In some embodiments, the liquid phase comprises the propylene glycol and the one or both of 1-hydroxypropane-2-oxide and 2-hydroxypropane-1-oxide at a molar ratio of no greater than 500,000,000:1. In some embodiments, the liquid phase comprises the propylene glycol and the one or both of 1-hydroxypropane-2-oxide and 2-hydroxypropane-1-oxide at a molar ratio of no greater than 100,000,000:1. In some embodiments, the liquid phase comprises the propylene glycol and the one or both of 1-hydroxypropane-2-oxide and 2-hydroxypropane-1-oxide at a molar ratio of no greater than 50,000,000:1. In some embodiments, the liquid phase comprises the propylene glycol and the one or both of 1-hydroxypropane-2-oxide and 2-hydroxypropane-1-oxide at a molar ratio of no greater than 10,000,000:1. In some embodiments, the liquid phase comprises the propylene glycol and the one or both of 1-hydroxypropane-2-oxide and 2-hydroxypropane-1-oxide at a molar ratio of no greater than 5,000,000:1. In some embodiments, the liquid phase comprises the propylene glycol and the one or both of 1-hydroxypropane-2-oxide and 2-hydroxypropane-1-oxide at a molar ratio of no greater than 1,000,000:1. In some embodiments, the liquid phase comprises the propylene glycol and the one or both of 1-hydroxypropane-2-oxide and 2-hydroxypropane-1-oxide at a molar ratio of no greater than 500,000:1. In some embodiments, the liquid phase comprises the propylene glycol and the one or both of 1-hydroxypropane-2-oxide and 2-hydroxypropane-1-oxide at a molar ratio of no greater than 100,000:1. In some embodiments, the liquid phase comprises the propylene glycol and the one or both of 1-hydroxypropane-2-oxide and 2-hydroxypropane-1-oxide at a molar ratio of no greater than 50,000:1. In some embodiments, the liquid phase lacks propylene glycol.

In some embodiments, the solutes of the liquid phase comprise ethanol; and the ethanol is dissolved in the glycerol of the liquid phase.

In some embodiments, the concentration of the ethanol in the liquid phase is at least 1 percent by mass. In some embodiments, the concentration of the ethanol in the liquid phase is at least 5 percent by mass. In some embodiments, the concentration of the ethanol in the liquid phase is at least 10 percent by mass. In some embodiments, the concentration of the ethanol in the liquid phase is at least 15 percent by mass. In some embodiments, the concentration of the ethanol in the liquid phase is at least 20 percent by mass. In some embodiments, the concentration of the ethanol in the liquid phase is at least 25 percent by mass. In some embodiments, the concentration of the ethanol in the liquid phase is at least 30 percent by mass. In some embodiments, the concentration of the ethanol in the liquid phase is at least 35 percent by mass.

In some embodiments, the concentration of the ethanol in the liquid phase is no greater than 40 percent by mass. In some embodiments, the concentration of the ethanol in the liquid phase is no greater than 35 percent by mass. In some embodiments, the concentration of the ethanol in the liquid phase is no greater than 30 percent by mass. In some embodiments, the concentration of the ethanol in the liquid phase is no greater than 25 percent by mass. In some embodiments, the concentration of the ethanol in the liquid phase is no greater than 20 percent by mass. In some embodiments, the concentration of the ethanol in the liquid phase is no greater than 15 percent by mass. In some embodiments, the concentration of the ethanol in the liquid phase is no greater than 10 percent by mass. In some embodiments, the concentration of the ethanol in the liquid phase is no greater than 5 percent by mass.

In some embodiments, the liquid phase lacks ethanol at a concentration greater than 500 parts per million by mass. In some embodiments, the liquid phase lacks ethanol at a concentration greater than 100 parts per million by mass. In some embodiments, the liquid phase lacks ethanol at a concentration greater than 50 parts per million by mass. In some embodiments, the liquid phase lacks ethanol at a concentration greater than 10 parts per million by mass. In some embodiments, the liquid phase lacks ethanol at a concentration greater than 5 parts per million by mass. In some embodiments, the liquid phase lacks ethanol at a concentration greater than 1 part per million by mass.

In some embodiments, the solutes of the liquid phase comprise ethyl oxonium and ethoxide, which are dissolved in the glycerol of the liquid phase.

In some embodiments, the liquid phase comprises the ethyl oxonium and the ethoxide at a molar ratio of at least 1:1,000,000. In some embodiments, the liquid phase comprises the ethyl oxonium and the ethoxide at a molar ratio of at least 1:500,000. In some embodiments, the liquid phase comprises the ethyl oxonium and the ethoxide at a molar ratio of at least 1:100,000. In some embodiments, the liquid phase comprises the ethyl oxonium and the ethoxide at a molar ratio of at least 1:50,000. In some embodiments, the liquid phase comprises the ethyl oxonium and the ethoxide at a molar ratio of at least 1:10,000. In some embodiments, the liquid phase comprises the ethyl oxonium and the ethoxide at a molar ratio of at least 1:5,000. In some embodiments, the liquid phase comprises the ethyl oxonium and the ethoxide at a molar ratio of at least 1:1,000. In some embodiments, the liquid phase comprises the ethyl oxonium and the ethoxide at a molar ratio of at least 1:500. In some embodiments, the liquid phase comprises the ethyl oxonium and the ethoxide at a molar ratio of at least 1:100. In some embodiments, the liquid phase comprises the ethyl oxonium and the ethoxide at a molar ratio of at least 1:50. In some embodiments, the liquid phase comprises the ethyl oxonium and the ethoxide at a molar ratio of at least 1:10. In some embodiments, the liquid phase comprises the ethyl oxonium and the ethoxide at a molar ratio of at least 1:5. In some embodiments, the liquid phase comprises the ethyl oxonium and the ethoxide at a molar ratio of at least 1:1. In some embodiments, the liquid phase comprises the ethyl oxonium and the ethoxide at a molar ratio of at least 5:1. In some embodiments, the liquid phase comprises the ethyl oxonium and the ethoxide at a molar ratio of at least 10:1. In some embodiments, the liquid phase comprises the ethyl oxonium and the ethoxide at a molar ratio of at least 50:1. In some embodiments, the liquid phase comprises the ethyl oxonium and the ethoxide at a molar ratio of at least 100:1. In some embodiments, the liquid phase comprises the ethyl oxonium and the ethoxide at a molar ratio of at least 500:1. In some embodiments, the liquid phase comprises the ethyl oxonium and the ethoxide at a molar ratio of at least 1,000:1. In some embodiments, the liquid phase comprises the ethyl oxonium and the ethoxide at a molar ratio of at least 5,000:1. In some embodiments, the liquid phase comprises the ethyl oxonium and the ethoxide at a molar ratio of at least 10,000:1. In some embodiments, the liquid phase comprises the ethyl oxonium and the ethoxide at a molar ratio of at least 50,000:1. In some embodiments, the liquid phase comprises the ethyl oxonium and the ethoxide at a molar ratio of at least 100,000:1. In some embodiments, the liquid phase comprises the ethyl oxonium and the ethoxide at a molar ratio of at least 500,000:1.

In some embodiments, the liquid phase comprises the ethyl oxonium and the ethoxide at a molar ratio of no greater than 1,000,000:1. In some embodiments, the liquid phase comprises the ethyl oxonium and the ethoxide at a molar ratio of no greater than 500,000:1. In some embodiments, the liquid phase comprises the ethyl oxonium and the ethoxide at a molar ratio of no greater than 100,000:1. In some embodiments, the liquid phase comprises the ethyl oxonium and the ethoxide at a molar ratio of no greater than 50,000:1. In some embodiments, the liquid phase comprises the ethyl oxonium and the ethoxide at a molar ratio of no greater than 10,000:1. In some embodiments, the liquid phase comprises the ethyl oxonium and the ethoxide at a molar ratio of no greater than 5,000:1. In some embodiments, the liquid phase comprises the ethyl oxonium and the ethoxide at a molar ratio of no greater than 1,000:1. In some embodiments, the liquid phase comprises the ethyl oxonium and the ethoxide at a molar ratio of no greater than 500:1. In some embodiments, the liquid phase comprises the ethyl oxonium and the ethoxide at a molar ratio of no greater than 100:1. In some embodiments, the liquid phase comprises the ethyl oxonium and the ethoxide at a molar ratio of no greater than 50:1. In some embodiments, the liquid phase comprises the ethyl oxonium and the ethoxide at a molar ratio of no greater than 10:1. In some embodiments, the liquid phase comprises the ethyl oxonium and the ethoxide at a molar ratio of no greater than 5:1. In some embodiments, the liquid phase comprises the ethyl oxonium and the ethoxide at a molar ratio of no greater than 1:1. In some embodiments, the liquid phase comprises the ethyl oxonium and the ethoxide at a molar ratio of no greater than 1:5. In some embodiments, the liquid phase comprises the ethyl oxonium and the ethoxide at a molar ratio of no greater than 1:10. In some embodiments, the liquid phase comprises the ethyl oxonium and the ethoxide at a molar ratio of no greater than 1:50. In some embodiments, the liquid phase comprises the ethyl oxonium and the ethoxide at a molar ratio of no greater than 1:100. In some embodiments, the liquid phase comprises the ethyl oxonium and the ethoxide at a molar ratio of no greater than 1:500. In some embodiments, the liquid phase comprises the ethyl oxonium and the ethoxide at a molar ratio of no greater than 1:1,000. In some embodiments, the liquid phase comprises the ethyl oxonium and the ethoxide at a molar ratio of no greater than 1:5,000. In some embodiments, the liquid phase comprises the ethyl oxonium and the ethoxide at a molar ratio of no greater than 1:10,000. In some embodiments, the liquid phase comprises the ethyl oxonium and the ethoxide at a molar ratio of no greater than 1:50,000. In some embodiments, the liquid phase comprises the ethyl oxonium and the ethoxide at a molar ratio of no greater than 1:100,000. In some embodiments, the liquid phase comprises the ethyl oxonium and the ethoxide at a molar ratio of no greater than 1:500,000.

In some embodiments, the liquid phase lacks ethanol.

In some embodiments, the solutes of the liquid phase comprise water; and the water is dissolved in the glycerol of the liquid phase.

In some embodiments, the concentration of the water in the liquid phase is at least 5 parts per million by mass. In some embodiments, the concentration of the water in the liquid phase is at least 10 parts per million by mass. In some embodiments, the concentration of the water in the liquid phase is at least 50 parts per million by mass. In some embodiments, the concentration of the water in the liquid phase is at least 100 parts per million by mass. In some embodiments, the concentration of the water in the liquid phase is at least 500 parts per million by mass. In some embodiments, the concentration of the water in the liquid phase is at least 0.1 percent by mass. In some embodiments, the concentration of the water in the liquid phase is at least 0.5 percent by mass. In some embodiments, the concentration of the water in the liquid phase is at least 1 percent by mass. In some embodiments, the concentration of the water in the liquid phase is at least 5 percent by mass. In some embodiments, the concentration of the water in the liquid phase is at least 10 percent by mass. In some embodiments, the concentration of the water in the liquid phase is at least 15 percent by mass. In some embodiments, the concentration of the water in the liquid phase is at least 20 percent by mass. In some embodiments, the concentration of the water in the liquid phase is at least 25 percent by mass. In some embodiments, the concentration of the water in the liquid phase is at least 30 percent by mass. In some embodiments, the concentration of the water in the liquid phase is at least 35 percent by mass.

In some embodiments, the concentration of the water in the liquid phase is no greater than 40 percent by mass. In some embodiments, the concentration of the water in the liquid phase is no greater than 35 percent by mass. In some embodiments, the concentration of the water in the liquid phase is no greater than 30 percent by mass. In some embodiments, the concentration of the water in the liquid phase is no greater than 25 percent by mass. In some embodiments, the concentration of the water in the liquid phase is no greater than 20 percent by mass. In some embodiments, the concentration of the water in the liquid phase is no greater than 15 percent by mass. In some embodiments, the concentration of the water in the liquid phase is no greater than 10 percent by mass. In some embodiments, the concentration of the water in the liquid phase is no greater than 5 percent by mass.

In some embodiments, the liquid phase lacks water at a concentration greater than 1 percent by mass. In some embodiments, the liquid phase lacks water at a concentration greater than 0.5 percent by mass. In some embodiments, the liquid phase lacks water at a concentration greater than 0.1 percent by mass. In some embodiments, the liquid phase lacks water at a concentration greater than 500 parts per million by mass. In some embodiments, the liquid phase lacks water at a concentration greater than 100 parts per million by mass. In some embodiments, the liquid phase lacks water at a concentration greater than 50 parts per million by mass. In some embodiments, the liquid phase lacks water at a concentration greater than 10 parts per million by mass. In some embodiments, the liquid phase lacks water at a concentration greater than 5 parts per million by mass. In some embodiments, the liquid phase lacks water at a concentration greater than 1 part per million by mass.

In some embodiments, the solutes of the liquid phase comprise hydronium and hydroxide, which are dissolved in the glycerol of the liquid phase.

In some embodiments, the liquid phase comprises the hydronium and the hydroxide at a molar ratio of at least 1:1,000,000. In some embodiments, the liquid phase comprises the hydronium and the hydroxide at a molar ratio of at least 1:500,000. In some embodiments, the liquid phase comprises the hydronium and the hydroxide at a molar ratio of at least 1:100,000. In some embodiments, the liquid phase comprises the hydronium and the hydroxide at a molar ratio of at least 1:50,000. In some embodiments, the liquid phase comprises the hydronium and the hydroxide at a molar ratio of at least 1:10,000. In some embodiments, the liquid phase comprises the hydronium and the hydroxide at a molar ratio of at least 1:5,000. In some embodiments, the liquid phase comprises the hydronium and the hydroxide at a molar ratio of at least 1:1,000. In some embodiments, the liquid phase comprises the hydronium and the hydroxide at a molar ratio of at least 1:500. In some embodiments, the liquid phase comprises the hydronium and the hydroxide at a molar ratio of at least 1:100. In some embodiments, the liquid phase comprises the hydronium and the hydroxide at a molar ratio of at least 1:50. In some embodiments, the liquid phase comprises the hydronium and the hydroxide at a molar ratio of at least 1:10. In some embodiments, the liquid phase comprises the hydronium and the hydroxide at a molar ratio of at least 1:5. In some embodiments, the liquid phase comprises the hydronium and the hydroxide at a molar ratio of at least 1:1. In some embodiments, the liquid phase comprises the hydronium and the hydroxide at a molar ratio of at least 5:1. In some embodiments, the liquid phase comprises the hydronium and the hydroxide at a molar ratio of at least 10:1. In some embodiments, the liquid phase comprises the hydronium and the hydroxide at a molar ratio of at least 50:1. In some embodiments, the liquid phase comprises the hydronium and the hydroxide at a molar ratio of at least 100:1. In some embodiments, the liquid phase comprises the hydronium and the hydroxide at a molar ratio of at least 500:1. In some embodiments, the liquid phase comprises the hydronium and the hydroxide at a molar ratio of at least 1,000:1. In some embodiments, the liquid phase comprises the hydronium and the hydroxide at a molar ratio of at least 5,000:1. In some embodiments, the liquid phase comprises the hydronium and the hydroxide at a molar ratio of at least 10,000:1. In some embodiments, the liquid phase comprises the hydronium and the hydroxide at a molar ratio of at least 50,000:1. In some embodiments, the liquid phase comprises the hydronium and the hydroxide at a molar ratio of at least 100,000:1. In some embodiments, the liquid phase comprises the hydronium and the hydroxide at a molar ratio of at least 500,000:1.

In some embodiments, the liquid phase comprises the hydronium and the hydroxide at a molar ratio of no greater than 1,000,000:1. In some embodiments, the liquid phase comprises the hydronium and the hydroxide at a molar ratio of no greater than 500,000:1. In some embodiments, the liquid phase comprises the hydronium and the hydroxide at a molar ratio of no greater than 100,000:1. In some embodiments, the liquid phase comprises the hydronium and the hydroxide at a molar ratio of no greater than 50,000:1. In some embodiments, the liquid phase comprises the hydronium and the hydroxide at a molar ratio of no greater than 10,000:1. In some embodiments, the liquid phase comprises the hydronium and the hydroxide at a molar ratio of no greater than 5,000:1. In some embodiments, the liquid phase comprises the hydronium and the hydroxide at a molar ratio of no greater than 1,000:1. In some embodiments, the liquid phase comprises the hydronium and the hydroxide at a molar ratio of no greater than 500:1. In some embodiments, the liquid phase comprises the hydronium and the hydroxide at a molar ratio of no greater than 100:1. In some embodiments, the liquid phase comprises the hydronium and the hydroxide at a molar ratio of no greater than 50:1. In some embodiments, the liquid phase comprises the hydronium and the hydroxide at a molar ratio of no greater than 10:1. In some embodiments, the liquid phase comprises the hydronium and the hydroxide at a molar ratio of no greater than 5:1. In some embodiments, the liquid phase comprises the hydronium and the hydroxide at a molar ratio of no greater than 1:1. In some embodiments, the liquid phase comprises the hydronium and the hydroxide at a molar ratio of no greater than 1:5. In some embodiments, the liquid phase comprises the hydronium and the hydroxide at a molar ratio of no greater than 1:10. In some embodiments, the liquid phase comprises the hydronium and the hydroxide at a molar ratio of no greater than 1:50. In some embodiments, the liquid phase comprises the hydronium and the hydroxide at a molar ratio of no greater than 1:100. In some embodiments, the liquid phase comprises the hydronium and the hydroxide at a molar ratio of no greater than 1:500. In some embodiments, the liquid phase comprises the hydronium and the hydroxide at a molar ratio of no greater than 1:1,000. In some embodiments, the liquid phase comprises the hydronium and the hydroxide at a molar ratio of no greater than 1:5,000. In some embodiments, the liquid phase comprises the hydronium and the hydroxide at a molar ratio of no greater than 1:10,000. In some embodiments, the liquid phase comprises the hydronium and the hydroxide at a molar ratio of no greater than 1:50,000. In some embodiments, the liquid phase comprises the hydronium and the hydroxide at a molar ratio of no greater than 1:100,000. In some embodiments, the liquid phase comprises the hydronium and the hydroxide at a molar ratio of no greater than 1:500,000.

In some embodiments, the liquid phase lacks water.

In some embodiments, the cannabinoid is 5-alkyl-2-geranylbenzene-1,3-diol.

In some embodiments, the cannabinoid is 5-alkyl-2-(6-isopropenyl-3-methylcyclohex-2-enyl)benzene-1,3-diol.

In some embodiments, the cannabinoid is 5-alkyl-2-(6-isopropenyl-3-methylcyclohex-3-enyl)benzene-1,3-diol.

In some embodiments, the cannabinoid is 3-alkyl-6,6,9-trimethyl-6a,7,8,10a-tetrahydro-6H-benzo[c]chromene-1-ol.

In some embodiments, the cannabinoid is 3-alkyl-6,6,9-trimethyl-6a,7,10,10a-tetrahydro-6H-benzo[c]chromene-1-ol.

In some embodiments, the cannabinoid is 3-alkyl-6,6,9-trimethyl-6H-benzo[c]chromene-1-ol.

In some embodiments, the cannabinoid is (3-alkyl-6,6,9-trimethyl-6a,7,8,10a-tetrahydro-6H-benzo[c]chromen-1-yl)-O-acetate.

In some embodiments, the cannabinoid is (3-alkyl-6,6,9-trimethyl-6a,7,10,10a-tetrahydro-6H-benzo[c]chromen-1-yl)-O-acetate.

In some embodiments, the cannabinoid is (3-alkyl-6,6,9-trimethyl-6H-benzo[c]chromen-1-yl)-O-acetate.

In some embodiments, the cannabinoid is 3-alkyl-6,6-dimethyl-9-oxo-6,6a,7,8,10,10a-hexahydro-9H-benzo[c]chromene-1-ol.

In some embodiments, the cannabinoid is 3-alkyl-9-(hydroxymethyl)-6,6-dimethyl-6a,7,8,10a-tetrahydro-6H-benzo[c]chromene-1-ol.

In some embodiments, the cannabinoid is 3-alkyl-9-(hydroxymethyl)-6,6-dimethyl-6a,7,10,10a-tetrahydro-6H-benzo[c]chromene-1-ol.

In some embodiments, the cannabinoid is 7-alkyl-2-methyl-2-(4-methylpent-3-enyl)-2H-1-benzopyran-5-ol.

In some embodiments, the cannabinoid is 5-alkyl-2-geranyl-3-hydroxyphenolate.

In some embodiments, the cannabinoid is 5-alkyl-3-hydroxy-2-(6-isopropenyl-3-methylcyclohex-2-enyl)phenolate.

In some embodiments, the cannabinoid is 5-alkyl-3-hydroxy-2-(6-isopropenyl-3-methylcyclohex-3-enyl)phenolate.

In some embodiments, the cannabinoid is 3-alkyl-6,6,9-trimethyl-6a,7,8,10a-tetrahydro-6H-benzo[c]chromene-1-oxide.

In some embodiments, the cannabinoid is 3-alkyl-6,6,9-trimethyl-6a,7,10,10a-tetrahydro-6H-benzo[c]chromene-1-oxide.

In some embodiments, the cannabinoid is 3-alkyl-6,6,9-trimethyl-6H-benzo[c]chromene-1-oxide.

In some embodiments, the cannabinoid is 3-alkyl-6,6-dimethyl-9-oxo-6,6a,7,8,10,10a-hexahydro-9H-benzo[c]chromene-1-oxide.

In some embodiments, the cannabinoid is 3-alkyl-9-(hydroxymethyl)-6,6-dimethyl-6a,7,8,10a-tetrahydro-6H-benzo[c]chromene-1-oxide.

In some embodiments, the cannabinoid is 3-alkyl-9-(hydroxymethyl)-6,6-dimethyl-6a,7,10,10a-tetrahydro-6H-benzo[c]chromene-1-oxide.

In some embodiments, the cannabinoid is 7-alkyl-2-methyl-2-(4-methylpent-3-enyl)-2H-1-benzopyran-5-oxide.

In some embodiments, the cannabinoid is 3-alkoxy-5-alkyl-2-geranylphenol.

In some embodiments, the cannabinoid is 1,3-dialkoxy-5-alkyl-2-geranylbenzene.

In some embodiments, the cannabinoid is 3-alkoxy-5-alkyl-2-(6-isopropenyl-3-methylcyclohex-2-enyl)phenol.

In some embodiments, the cannabinoid is 1,3-dialkoxy-5-alkyl-2-(6-isopropenyl-3-methylcyclohex-2-enyl)benzene.

In some embodiments, the cannabinoid is 3-alkoxy-5-alkyl-2-(6-isopropenyl-3-methylcyclohex-3-enyl)phenol.

In some embodiments, the cannabinoid is 1,3-dialkoxy-5-alkyl-2-(6-isopropenyl-3-methylcyclohex-3-enyl)phenol.

In some embodiments, the cannabinoid is 1-alkoxy-3-alkyl-6,6,9-trimethyl-6a,7,8,10a-tetrahydro-6H-benzo[c]chromene.

In some embodiments, the cannabinoid is 1-alkoxy-3-alkyl-6,6,9-trimethyl-6a,7,10,10a-tetrahydro-6H-benzo[c]chromene.

In some embodiments, the cannabinoid is 1-alkoxy-3-alkyl-6,6,9-trimethyl-6H-benzo[c]chromene.

In some embodiments, the cannabinoid is 1-alkoxy-3-alkyl-6,6-dimethyl-9-oxo-6,6a,7,8,10,10a-hexahydro-9H-benzo[c]chromene.

In some embodiments, the cannabinoid is 1-alkoxy-3-alkyl-9-(hydroxymethyl)-6,6-dimethyl-6a,7,8,10a-tetrahydro-6H-benzo[c]chromene.

In some embodiments, the cannabinoid is 1-alkoxy-3-alkyl-9-(hydroxymethyl)-6,6-dimethyl-6a,7,10,10a-tetrahydro-6H-benzo[c]chromene.

In some embodiments, the cannabinoid is 5-alkoxy-7-alkyl-2-methyl-2-(4-methylpent-3-enyl)-2H-1-benzopyran.

In some embodiments, the cannabinoid is N-{3-oxo-3-[(3-alkoxy-5-alkyl-2-geranylphenyl)oxy]propyl}morpholinium.

In some embodiments, the cannabinoid is N-{3-oxo-3-[(3-alkoxy-5-alkyl-2-geranylphenyl)oxy]propyl}morpholine.

In some embodiments, the cannabinoid is N-(3-oxo-3-{[3-alkoxy-5-alkyl-2-(6-isopropenyl-3-methylcyclohex-2-enyl)phenyl]oxy}propyl)morpholinium.

In some embodiments, the cannabinoid is N-(3-oxo-3-{[3-alkoxy-5-alkyl-2-(6-isopropenyl-3-methylcyclohex-2-enyl)phenyl]oxy}propyl)morpholine.

In some embodiments, the cannabinoid is N-(3-oxo-3-{[3-alkoxy-5-alkyl-2-(6-isopropenyl-3-methylcyclohex-3-enyl)phenyl]oxy}propyl)morpholinium.

In some embodiments, the cannabinoid is N-(3-oxo-3-{[3-alkoxy-5-alkyl-2-(6-isopropenyl-3-methylcyclohex-3-enyl)phenyl]oxy}propyl)morpholine.

In some embodiments, alkoxy is methoxy. In some embodiments, alkoxy is ethoxy. In some embodiments, alkoxy is 2-propoxy. In some embodiments, alkoxy is acetyloxy.

In some embodiments, alkyl is methyl. In some embodiments, alkyl is ethyl. In some embodiments, alkyl is propyl. In some embodiments, alkyl is butyl. In some embodiments, alkyl is pentyl. In some embodiments, alkyl is hexyl. In some embodiments, alkyl is heptyl. In some embodiments, alkyl is octyl. In some embodiments, alkyl is nonyl. In some embodiments, alkyl is decyl. In some embodiments, alkyl is undecyl. In some embodiments, alkyl is dodecyl. In some embodiments, alkyl is prop-2-yl. In some embodiments, alkyl is but-2-yl. In some embodiments, alkyl is pent-2-yl. In some embodiments, alkyl is hex-2-yl. In some embodiments, alkyl is hept-2-yl. In some embodiments, alkyl is octan-2-yl. In some embodiments, alkyl is nonan-2-yl. In some embodiments, alkyl is dec-2-yl. In some embodiments, alkyl is undec-2-yl. In some embodiments, alkyl is dodec-2-yl. In some embodiments, alkyl is 2-methylpropyl. In some embodiments, alkyl is 2-methylbutyl. In some embodiments, alkyl is 2-methylpentyl. In some embodiments, alkyl is 2-methylhexyl. In some embodiments, alkyl is 2-methylheptyl. In some embodiments, alkyl is 2-methyloctyl. In some embodiments, alkyl is 2-methylnonyl. In some embodiments, alkyl is 2-methyldecyl. In some embodiments, alkyl is 2-methylundecyl. In some embodiments, alkyl is 2-methylprop-2-yl. In some embodiments, alkyl is 2-methylbut-2-yl. In some embodiments, alkyl is 2-methylpent-2-yl. In some embodiments, alkyl is 2-methylhex-2-yl. In some embodiments, alkyl is 2-methylhept-2-yl. In some embodiments, alkyl is 2-methyloct-2-yl. In some embodiments, alkyl is 2-methylnonan-2-yl. In some embodiments, alkyl is 2-methyldec-2-yl. In some embodiments, alkyl is 2-methylundec-2-yl. In some embodiments, alkyl is 3-methylbut-2-yl. In some embodiments, alkyl is 3-methylpent-2-yl. In some embodiments, alkyl is 3-methylhex-2-yl. In some embodiments, alkyl is 3-methylhept-2-yl. In some embodiments, alkyl is 3-methyloct-2-yl. In some embodiments, alkyl is 3-methylnonan-2-yl. In some embodiments, alkyl is 3-methyldec-2-yl. In some embodiments, alkyl is 3-methylundec-2-yl. In some embodiments, alkyl is 2,3-dimethylbut-2-yl. In some embodiments, alkyl is 2,3-dimethylpent-2-yl. In some embodiments, alkyl is 2,3-dimethylhex-2-yl. In some embodiments, alkyl is 2,3-dimethylhept-2-yl. In some embodiments, alkyl is 2,3-dimethyloct-2-yl. In some embodiments, alkyl is 2,3-dimethylnonan-2-yl. In some embodiments, alkyl is 2,3-dimethyldec-2-yl. In some embodiments, alkyl is cyclopropyl. In some embodiments, alkyl is 1-methylcyclopropyl. In some embodiments, alkyl is 1-ethylcyclopropyl. In some embodiments, alkyl is 1-propylcyclopropyl. In some embodiments, alkyl is 1-butylcyclopropyl. In some embodiments, alkyl is 1-pentylcyclopropyl. In some embodiments, alkyl is 1-hexylcyclopropyl. In some embodiments, alkyl is 1-heptylcyclopropyl. In some embodiments, alkyl is 1-octylcyclopropyl. In some embodiments, alkyl is 1-nonylcyclopropyl. In some embodiments, alkyl is cyclobutyl. In some embodiments, alkyl is 1-methylcyclobutyl. In some embodiments, alkyl is 1-ethylcyclobutyl. In some embodiments, alkyl is 1-propylcyclobutyl. In some embodiments, alkyl is 1-butylcyclobutyl. In some embodiments, alkyl is 1-pentylcyclobutyl. In some embodiments, alkyl is 1-hexylcyclobutyl. In some embodiments, alkyl is 1-heptylcyclobutyl. In some embodiments, alkyl is 1-octylcyclobutyl. In some embodiments, alkyl is cyclopentyl. In some embodiments, alkyl is 1-methylcyclopentyl. In some embodiments, alkyl is 1-ethylcyclopentyl. In some embodiments, alkyl is 1-propylcyclopentyl. In some embodiments, alkyl is 1-butylcyclopentyl. In some embodiments, alkyl is 1-pentylcyclopentyl. In some embodiments, alkyl is 1-hexylcyclopentyl. In some embodiments, alkyl is 1-heptylcyclopentyl. In some embodiments, alkyl is cyclohexyl. In some embodiments, alkyl is 1-methylcyclohexyl. In some embodiments, alkyl is 1-ethylcyclohexyl. In some embodiments, alkyl is 1-propylcyclohexyl. In some embodiments, alkyl is 1-butylcyclohexyl. In some embodiments, alkyl is 1-pentylcyclohexyl. In some embodiments, alkyl is 1-hexylcyclohexyl. In some embodiments, alkyl is ethenyl. In some embodiments, alkyl is prop-1-enyl. In some embodiments, alkyl is but-1-enyl. In some embodiments, alkyl is pent-1-enyl. In some embodiments, alkyl is hex-1-enyl. In some embodiments, alkyl is hept-1-enyl. In some embodiments, alkyl is oct-1-enyl. In some embodiments, alkyl is nonan-1-enyl. In some embodiments, alkyl is dec-1-enyl. In some embodiments, alkyl is undec-1-enyl. In some embodiments, alkyl is dodec-1-enyl. In some embodiments, alkyl is ethynyl. In some embodiments, alkyl is prop-1-ynyl. In some embodiments, alkyl is but-1-ynyl. In some embodiments, alkyl is pent-1-ynyl. In some embodiments, alkyl is hex-1-ynyl. In some embodiments, alkyl is hept-1-ynyl. In some embodiments, alkyl is oct-1-ynyl. In some embodiments, alkyl is nonan-1-ynyl. In some embodiments, alkyl is dec-1-ynyl. In some embodiments, alkyl is undec-1-ynyl. In some embodiments, alkyl is dodec-1-ynyl. In some embodiments, alkyl is 2-phenylethyl. In some embodiments, alkyl is 2-phenylprop-2-yl. In some embodiments, alkyl is adamant-1-yl. In some embodiments, alkyl is adamant-2-yl. In some embodiments, alkyl is 6-fluorohex-2-enyl. In some embodiments, alkyl is 6-fluorohex-2-ynyl. In some embodiments, alkyl is 2-methyl-6-fluorohex-2-yl. In some embodiments, alkyl is 6-chlorohex-2-enyl. In some embodiments, alkyl is 6-chlorohex-2-ynyl. In some embodiments, alkyl is 2-methyl-6-chlorohex-2-yl. In some embodiments, alkyl is 6-bromohex-2-enyl. In some embodiments, alkyl is 6-bromohex-2-ynyl. In some embodiments, alkyl is 2-methyl-6-bromohex-2-yl. In some embodiments, alkyl is 6-iodohex-2-enyl. In some embodiments, alkyl is 6-iodohex-2-ynyl. In some embodiments, alkyl is 2-methyl-6-iodohex-2-yl.

In some embodiments, the cannabinoid is cannabidiol.

In some embodiments, the cannabinoid is tetrahydrocannabinol.

In some embodiments, the cannabinoid is delta8-tetrahydrocannabinol.

In some embodiments, the cannabinoid is cannabigerol.

In some embodiments, the cannabinoid is cannabidivarin.

In some embodiments, the cannabinoid is tetrahydrocannabivarin.

In some embodiments, the cannabinoid is delta8-tetrahydrocannabivarin.

In some embodiments, the cannabinoid is cannabigerovarin.

In some embodiments, the cannabinoid is cannabichromene.

In some embodiments, the cannabinoid is cannabinol.

In some embodiments, the cannabinoid is cannabivarin.

In some embodiments, the cannabinoid is tetrahydrocannabiphorol.

In some embodiments, the cannabinoid is perrottetinene.

In some embodiments, the cannabinoid is nabilone.

In some embodiments, the cannabinoid is parahexyl.

In some embodiments, the cannabinoid is HUM-217.

In some embodiments, the cannabinoid is HU-331.

Various aspects of the disclosure relate to a composition, comprising a liquid phase that comprises a cannabinoid.

In some embodiments, the liquid phase comprises no greater than 2.0 food calories per milligram of the cannabinoid. In some embodiments, the liquid phase comprises no greater than 1.9 food calories per milligram of the cannabinoid. In some embodiments, the liquid phase comprises no greater than 1.8 food calories per milligram of the cannabinoid. In some embodiments, the liquid phase comprises no greater than 1.7 food calories per milligram of the cannabinoid. In some embodiments, the liquid phase comprises no greater than 1.6 food calories per milligram of the cannabinoid. In some embodiments, the liquid phase comprises no greater than 1.5 food calories per milligram of the cannabinoid. In some embodiments, the liquid phase comprises no greater than 1.4 food calories per milligram of the cannabinoid. In some embodiments, the liquid phase comprises no greater than 1.3 food calories per milligram of the cannabinoid. In some embodiments, the liquid phase comprises no greater than 1.2 food calories per milligram of the cannabinoid. In some embodiments, the liquid phase comprises no greater than 1.1 food calories per milligram of the cannabinoid. In some embodiments, the liquid phase comprises no greater than 1.0 food calories per milligram of the cannabinoid. In some embodiments, the liquid phase comprises no greater than 0.9 food calories per milligram of the cannabinoid. In some embodiments, the liquid phase comprises no greater than 0.8 food calories per milligram of the cannabinoid. In some embodiments, the liquid phase comprises no greater than 0.7 food calories per milligram of the cannabinoid. In some embodiments, the liquid phase comprises no greater than 0.6 food calories per milligram of the cannabinoid. In some embodiments, the liquid phase comprises no greater than 0.5 food calories per milligram of the cannabinoid. In some embodiments, the liquid phase comprises no greater than 0.4 food calories per milligram of the cannabinoid. In some embodiments, the liquid phase comprises no greater than 0.3 food calories per milligram of the cannabinoid. In some embodiments, the liquid phase comprises no greater than 0.2 food calories per milligram of the cannabinoid.

In some embodiments, the liquid phase comprises at least 0.1 food calories per milligram of the cannabinoid. In some embodiments, the liquid phase comprises at least 0.2 food calories per milligram of the cannabinoid. In some embodiments, the liquid phase comprises at least 0.3 food calories per milligram of the cannabinoid. In some embodiments, the liquid phase comprises at least 0.4 food calories per milligram of the cannabinoid. In some embodiments, the liquid phase comprises at least 0.5 food calories per milligram of the cannabinoid. In some embodiments, the liquid phase comprises at least 0.6 food calories per milligram of the cannabinoid. In some embodiments, the liquid phase comprises at least 0.7 food calories per milligram of the cannabinoid. In some embodiments, the liquid phase comprises at least 0.8 food calories per milligram of the cannabinoid.

In some embodiments, the composition comprises at least 10 milligrams of the liquid phase. In some embodiments, the composition comprises at least 20 milligrams of the liquid phase. In some embodiments, the composition comprises at least 40 milligrams of the liquid phase. In some embodiments, the composition comprises at least 60 milligrams of the liquid phase. In some embodiments, the composition comprises at least 80 milligrams of the liquid phase. In some embodiments, the composition comprises at least 100 milligrams of the liquid phase. In some embodiments, the composition comprises at least 120 milligrams of the liquid phase. In some embodiments, the composition comprises at least 140 milligrams of the liquid phase. In some embodiments, the composition comprises at least 160 milligrams of the liquid phase. In some embodiments, the composition comprises at least 180 milligrams of the liquid phase.

In some embodiments, the composition comprises no greater than 300 milligrams of the liquid phase. In some embodiments, the composition comprises no greater than 280 milligrams of the liquid phase. In some embodiments, the composition comprises no greater than 260 milligrams of the liquid phase. In some embodiments, the composition comprises no greater than 240 milligrams of the liquid phase. In some embodiments, the composition comprises no greater than 220 milligrams of the liquid phase. In some embodiments, the composition comprises no greater than 200 milligrams of the liquid phase. In some embodiments, the composition comprises no greater than 180 milligrams of the liquid phase. In some embodiments, the composition comprises no greater than 160 milligrams of the liquid phase. In some embodiments, the composition comprises no greater than 140 milligrams of the liquid phase. In some embodiments, the composition comprises no greater than 120 milligrams of the liquid phase.

In some embodiments, the composition comprises at least 0.12 food calories. In some embodiments, the composition comprises at least 0.16 food calories. In some embodiments, the composition comprises at least 0.20 food calories. In some embodiments, the composition comprises at least 0.24 food calories. In some embodiments, the composition comprises at least 0.28 food calories. In some embodiments, the composition comprises at least 0.32 food calories. In some embodiments, the composition comprises at least 0.36 food calories. In some embodiments, the composition comprises at least 0.40 food calories. In some embodiments, the composition comprises at least 0.44 food calories. In some embodiments, the composition comprises at least 0.48 food calories. In some embodiments, the composition comprises at least 0.52 food calories. In some embodiments, the composition comprises at least 0.56 food calories. In some embodiments, the composition comprises at least 0.60 food calories. In some embodiments, the composition comprises at least 0.64 food calories. In some embodiments, the composition comprises at least 0.68 food calories. In some embodiments, the composition comprises at least 0.72 food calories. In some embodiments, the composition comprises at least 0.76 food calories. In some embodiments, the composition comprises at least 0.80 food calories. In some embodiments, the composition comprises at least 0.84 food calories.

In some embodiments, the composition comprises no greater than 2.00 food calories. In some embodiments, the composition comprises no greater than 1.90 food calories. In some embodiments, the composition comprises no greater than 1.80 food calories. In some embodiments, the composition comprises no greater than 1.70 food calories. In some embodiments, the composition comprises no greater than 1.60 food calories. In some embodiments, the composition comprises no greater than 1.50 food calories. In some embodiments, the composition comprises no greater than 1.40 food calories. In some embodiments, the composition comprises no greater than 1.30 food calories. In some embodiments, the composition comprises no greater than 1.20 food calories. In some embodiments, the composition comprises no greater than 1.10 food calories. In some embodiments, the composition comprises no greater than 1.00 food calories. In some embodiments, the composition comprises no greater than 0.90 food calories. In some embodiments, the composition comprises no greater than 0.86 food calories. In some embodiments, the composition comprises no greater than 0.82 food calories. In some embodiments, the composition comprises no greater than 0.78 food calories. In some embodiments, the composition comprises no greater than 0.74 food calories. In some embodiments, the composition comprises no greater than 0.70 food calories. In some embodiments, the composition comprises no greater than 0.66 food calories. In some embodiments, the composition comprises no greater than 0.62 food calories.

In some embodiments, the composition comprises at least 1 microgram of the cannabinoid. In some embodiments, the composition comprises at least 2 micrograms of the cannabinoid. In some embodiments, the composition comprises at least 4 micrograms of the cannabinoid. In some embodiments, the composition comprises at least 8 micrograms of the cannabinoid. In some embodiments, the composition comprises at least 16 micrograms of the cannabinoid. In some embodiments, the composition comprises at least 32 micrograms of the cannabinoid. In some embodiments, the composition comprises at least 64 micrograms of the cannabinoid. In some embodiments, the composition comprises at least 128 micrograms of the cannabinoid. In some embodiments, the composition comprises at least 256 micrograms of the cannabinoid. In some embodiments, the composition comprises at least 0.48 milligrams of the cannabinoid. In some embodiments, the composition comprises at least 0.6 milligrams of the cannabinoid. In some embodiments, the composition comprises at least 0.7 milligrams of the cannabinoid. In some embodiments, the composition comprises at least 0.8 milligrams of the cannabinoid. In some embodiments, the composition comprises at least 0.9 milligrams of the cannabinoid.

In some embodiments, the composition comprises no greater than 2.1 milligrams of the cannabinoid. In some embodiments, the composition comprises no greater than 2.0 milligrams of the cannabinoid. In some embodiments, the composition comprises no greater than 1.9 milligrams of the cannabinoid. In some embodiments, the composition comprises no greater than 1.8 milligrams of the cannabinoid. In some embodiments, the composition comprises no greater than 1.7 milligrams of the cannabinoid. In some embodiments, the composition comprises no greater than 1.6 milligrams of the cannabinoid. In some embodiments, the composition comprises no greater than 1.5 milligrams of the cannabinoid. In some embodiments, the composition comprises no greater than 1.4 milligrams of the cannabinoid. In some embodiments, the composition comprises no greater than 1.3 milligrams of the cannabinoid. In some embodiments, the composition comprises no greater than 1.2 milligrams of the cannabinoid. In some embodiments, the composition comprises no greater than 1.1 milligrams of the cannabinoid.

In some embodiments, the composition is a spray.

In some embodiments, the composition is an aerosol.

In some embodiments, the composition is an aerosol spray.

In some embodiments, the composition comprises a gas phase, wherein the liquid phase is a dispersed phase; the gas phase is a dispersion medium; and the liquid phase is suspended in the gas phase.

In some embodiments, the gas phase comprises air. In some embodiments, the gas phase consists essentially of air.

In some embodiments, the gas phase comprises a propellant. In some embodiments, the gas phase consists essentially of the propellant.

In some embodiments, the propellant is nitrous oxide.

In some embodiments, the propellant is carbon dioxide.

In some embodiments, the propellant is 1,1,1,2-tetrafluorethane.

In some embodiments, the propellant is 1,1,1,2,3,3,3-heptafluoropropane.

In some embodiments, the propellant is hydrofluoroolefin.

In some embodiments, the propellant is dimethyl ether.

In some embodiments, the propellant is methyl ethyl ether.

Various aspects of the disclosure relate to a container configured to dispense a composition as described anywhere in the disclosure.

Various aspects of the disclosure relate to a container, comprising a chamber that contains a composition as described anywhere in the disclosure.

In some embodiments, the liquid phase of a composition of a container comprises at least 10 micrograms of the cannabinoid. In some embodiments, the liquid phase comprises at least 20 micrograms of the cannabinoid. In some embodiments, the liquid phase comprises at least 40 micrograms of the cannabinoid. In some embodiments, the liquid phase comprises at least 80 micrograms of the cannabinoid. In some embodiments, the liquid phase comprises at least 160 micrograms of the cannabinoid. In some embodiments, the liquid phase comprises at least 320 micrograms of the cannabinoid. In some embodiments, the liquid phase comprises at least 640 micrograms of the cannabinoid. In some embodiments, the liquid phase comprises at least 1 milligram of the cannabinoid In some embodiments, the liquid phase comprises at least 2 milligrams of the cannabinoid. In some embodiments, the liquid phase comprises at least 4 milligrams of the cannabinoid. In some embodiments, the liquid phase comprises at least 8 milligrams of the cannabinoid. In some embodiments, the liquid phase comprises at least 16 milligrams of the cannabinoid. In some embodiments, the liquid phase comprises at least 32 milligrams of the cannabinoid. In some embodiments, the liquid phase comprises at least 64 milligrams of the cannabinoid. In some embodiments, the liquid phase comprises at least 80 milligrams of the cannabinoid. In some embodiments, the liquid phase comprises at least 90 milligrams of the cannabinoid. In some embodiments, the liquid phase comprises at least 99 milligrams of the cannabinoid.

In some embodiments, the liquid phase of a composition of a container comprises no greater than 120 milligrams of the cannabinoid. In some embodiments, the liquid phase comprises no greater than 110 milligrams of the cannabinoid. In some embodiments, the liquid phase comprises no greater than 101 milligrams of the cannabinoid. In some embodiments, the liquid phase comprises no greater than 90 milligrams of the cannabinoid. In some embodiments, the liquid phase comprises no greater than 80 milligrams of the cannabinoid. In some embodiments, the liquid phase comprises no greater than 64 milligrams of the cannabinoid. In some embodiments, the liquid phase comprises no greater than 32 milligrams of the cannabinoid. In some embodiments, the liquid phase comprises no greater than 16 milligrams of the cannabinoid. In some embodiments, the liquid phase comprises no greater than 8 milligrams of the cannabinoid. In some embodiments, the liquid phase comprises no greater than 4 milligrams of the cannabinoid. In some embodiments, the liquid phase comprises no greater than 2 milligrams of the cannabinoid. In some embodiments, the liquid phase comprises no greater than 1 milligram of the cannabinoid.

In some embodiments, the container is configured to dispense at least 1 metered portion of the composition. In some embodiments, the container is configured to dispense at least 2 metered portions of the composition. In some embodiments, the container is configured to dispense at least 3 metered portions of the composition. In some embodiments, the container is configured to dispense at least 4 metered portions of the composition. In some embodiments, the container is configured to dispense at least 6 metered portions of the composition. In some embodiments, the container is configured to dispense at least 8 metered portions of the composition. In some embodiments, the container is configured to dispense at least 12 metered portions of the composition. In some embodiments, the container is configured to dispense at least 16 metered portions of the composition. In some embodiments, the container is configured to dispense at least 24 metered portions of the composition. In some embodiments, the container is configured to dispense at least 32 metered portions of the composition. In some embodiments, the container is configured to dispense at least 48 metered portions of the composition. In some embodiments, the container is configured to dispense at least 64 metered portions of the composition. In some embodiments, the container is configured to dispense at least 96 metered portions of the composition.

In some embodiments, the container is configured to dispense no greater than 110 metered portions of the composition. In some embodiments, the container is configured to dispense no greater than 96 metered portions of the composition. In some embodiments, the container is configured to dispense no greater than 48 metered portions of the composition. In some embodiments, the container is configured to dispense no greater than 24 metered portions of the composition. In some embodiments, the container is configured to dispense no greater than 12 metered portions of the composition.

In some embodiments, the metered portions have an average mass of at least 10 milligrams of the liquid phase. In some embodiments, the metered portions have an average mass of at least 20 milligrams of the liquid phase. In some embodiments, the metered portions have an average mass of at least 40 milligrams of the liquid phase. In some embodiments, the metered portions have an average mass of at least 60 milligrams of the liquid phase. In some embodiments, the metered portions have an average mass of at least 80 milligrams of the liquid phase. In some embodiments, the metered portions have an average mass of at least 100 milligrams of the liquid phase. In some embodiments, the metered portions have an average mass of at least 120 milligrams of the liquid phase. In some embodiments, the metered portions have an average mass of at least 140 milligrams of the liquid phase. In some embodiments, the metered portions have an average mass of at least 160 milligrams of the liquid phase. In some embodiments, the metered portions have an average mass of at least 180 milligrams of the liquid phase.

In some embodiments, the metered portions have an average mass of no greater than 300 milligrams of the liquid phase. In some embodiments, the metered portions have an average mass of no greater than 280 milligrams of the liquid phase. In some embodiments, the metered portions have an average mass of no greater than 260 milligrams of the liquid phase. In some embodiments, the metered portions have an average mass of no greater than 240 milligrams of the liquid phase. In some embodiments, the metered portions have an average mass of no greater than 220 milligrams of the liquid phase. In some embodiments, the metered portions have an average mass of no greater than 200 milligrams of the liquid phase. In some embodiments, the metered portions have an average mass of no greater than 180 milligrams of the liquid phase. In some embodiments, the metered portions have an average mass of no greater than 160 milligrams of the liquid phase. In some embodiments, the metered portions have an average mass of no greater than 140 milligrams of the liquid phase. In some embodiments, the metered portions have an average mass of no greater than 120 milligrams of the liquid phase.

In some embodiments, the metered portions have an average amount of food calories of at least 0.12 food calories. In some embodiments, the metered portions have an average amount of food calories of at least 0.16 food calories. In some embodiments, the metered portions have an average amount of food calories of at least 0.20 food calories. In some embodiments, the metered portions have an average amount of food calories of at least 0.24 food calories. In some embodiments, the metered portions have an average amount of food calories of at least 0.28 food calories. In some embodiments, the metered portions have an average amount of food calories of at least 0.32 food calories. In some embodiments, the metered portions have an average amount of food calories of at least 0.36 food calories. In some embodiments, the metered portions have an average amount of food calories of at least 0.40 food calories. In some embodiments, the metered portions have an average amount of food calories of at least 0.44 food calories. In some embodiments, the metered portions have an average amount of food calories of at least 0.48 food calories. In some embodiments, the metered portions have an average amount of food calories of at least 0.52 food calories. In some embodiments, the metered portions have an average amount of food calories of at least 0.56 food calories. In some embodiments, the metered portions have an average amount of food calories of at least 0.60 food calories. In some embodiments, the metered portions have an average amount of food calories of at least 0.64 food calories. In some embodiments, the metered portions have an average amount of food calories of at least 0.68 food calories. In some embodiments, the metered portions have an average amount of food calories of at least 0.72 food calories. In some embodiments, the metered portions have an average amount of food calories of at least 0.76 food calories. In some embodiments, the metered portions have an average amount of food calories of at least 0.80 food calories. In some embodiments, the metered portions have an average amount of food calories of at least 0.84 food calories.

In some embodiments, the metered portions have an average amount of food calories of no greater than 2.00 food calories. In some embodiments, the metered portions have an average amount of food calories of no greater than 1.90 food calories. In some embodiments, the metered portions have an average amount of food calories of no greater than 1.80 food calories. In some embodiments, the metered portions have an average amount of food calories of no greater than 1.70 food calories. In some embodiments, the metered portions have an average amount of food calories of no greater than 1.60 food calories. In some embodiments, the metered portions have an average amount of food calories of no greater than 1.50 food calories. In some embodiments, the metered portions have an average amount of food calories of no greater than 1.40 food calories. In some embodiments, the metered portions have an average amount of food calories of no greater than 1.30 food calories. In some embodiments, the metered portions have an average amount of food calories of no greater than 1.20 food calories. In some embodiments, the metered portions have an average amount of food calories of no greater than 1.10 food calories. In some embodiments, the metered portions have an average amount of food calories of no greater than 1.00 food calories. In some embodiments, the metered portions have an average amount of food calories of no greater than 0.90 food calories. In some embodiments, the metered portions have an average amount of food calories of no greater than 0.86 food calories. In some embodiments, the metered portions have an average amount of food calories of no greater than 0.82 food calories. In some embodiments, the metered portions have an average amount of food calories of no greater than 0.78 food calories. In some embodiments, the metered portions have an average amount of food calories of no greater than 0.74 food calories. In some embodiments, the metered portions have an average amount of food calories of no greater than 0.70 food calories. In some embodiments, the metered portions have an average amount of food calories of no greater than 0.66 food calories. In some embodiments, the metered portions have an average amount of food calories of no greater than 0.62 food calories.

In some embodiments, the metered portions have an average dose of the cannabinoid of at least 1 microgram. In some embodiments, the metered portions have an average dose of the cannabinoid of at least 2 micrograms. In some embodiments, the metered portions have an average dose of the cannabinoid of at least 4 micrograms. In some embodiments, the metered portions have an average dose of the cannabinoid of at least 8 micrograms. In some embodiments, the metered portions have an average dose of the cannabinoid of at least 16 micrograms. In some embodiments, the metered portions have an average dose of the cannabinoid of at least 32 micrograms. In some embodiments, the metered portions have an average dose of the cannabinoid of at least 64 micrograms. In some embodiments, the metered portions have an average dose of the cannabinoid of at least 128 micrograms. In some embodiments, the metered portions have an average dose of the cannabinoid of at least 256 micrograms. In some embodiments, the metered portions have an average dose of the cannabinoid of at least 0.48 milligrams. In some embodiments, the metered portions have an average dose of the cannabinoid of at least 0.6 milligrams. In some embodiments, the metered portions have an average dose of the cannabinoid of at least 0.7 milligrams. In some embodiments, the metered portions have an average dose of the cannabinoid of at least 0.8 milligrams. In some embodiments, the metered portions have an average dose of the cannabinoid of at least 0.9 milligrams.

In some embodiments, the metered portions have an average dose of the cannabinoid of no greater than 2.1 milligrams. In some embodiments, the metered portions have an average dose of the cannabinoid of no greater than 2.0 milligrams. In some embodiments, the metered portions have an average dose of the cannabinoid of no greater than 1.9 milligrams. In some embodiments, the metered portions have an average dose of the cannabinoid of no greater than 1.8 milligrams. In some embodiments, the metered portions have an average dose of the cannabinoid of no greater than 1.7 milligrams. In some embodiments, the metered portions have an average dose of the cannabinoid of no greater than 1.6 milligrams. In some embodiments, the metered portions have an average dose of the cannabinoid of no greater than 1.5 milligrams. In some embodiments, the metered portions have an average dose of the cannabinoid of no greater than 1.4 milligrams. In some embodiments, the metered portions have an average dose of the cannabinoid of no greater than 1.3 milligrams. In some embodiments, the metered portions have an average dose of the cannabinoid of no greater than 1.2 milligrams. In some embodiments, the metered portions have an average dose of the cannabinoid of no greater than 1.1 milligrams.

In some embodiments, the metered portions have a standard deviation of no greater than 30 percent of the average mass of the liquid phase. In some embodiments, the metered portions have a standard deviation of no greater than 25 percent of the average mass of the liquid phase. In some embodiments, the metered portions have a standard deviation of no greater than 20 percent of the average mass of the liquid phase. In some embodiments, the metered portions have a standard deviation of no greater than 15 percent of the average mass of the liquid phase. In some embodiments, the metered portions have a standard deviation of no greater than 10 percent of the average mass of the liquid phase. In some embodiments, the metered portions have a standard deviation of no greater than 5 percent of the average mass of the liquid phase.

In some embodiments, the metered portions have a standard deviation of no greater than 30 percent of the average amount of food calories. In some embodiments, the metered portions have a standard deviation of no greater than 25 percent of the average amount of food calories. In some embodiments, the metered portions have a standard deviation of no greater than 20 percent of the average amount of food calories. In some embodiments, the metered portions have a standard deviation of no greater than 15 percent of the average amount of food calories. In some embodiments, the metered portions have a standard deviation of no greater than 10 percent of the average amount of food calories. In some embodiments, the metered portions have a standard deviation of no greater than 5 percent of the average amount of food calories.

In some embodiments, the metered portions have a standard deviation of no greater than 30 percent of the average dose of the cannabinoid. In some embodiments, the metered portions have a standard deviation of no greater than 25 percent of the average dose of the cannabinoid. In some embodiments, the metered portions have a standard deviation of no greater than 20 percent of the average dose of the cannabinoid. In some embodiments, the metered portions have a standard deviation of no greater than 15 percent of the average dose of the cannabinoid. In some embodiments, the metered portions have a standard deviation of no greater than 10 percent of the average dose of the cannabinoid. In some embodiments, the metered portions have a standard deviation of no greater than 5 percent of the average dose of the cannabinoid.

In some embodiments, the container is configured to dispense a spray of the liquid phase.

In some embodiments, the container is configured to dispense an aerosol spray of the liquid phase.

Various aspects of the disclosure relate to a method to administer a cannabinoid to a subject, comprising providing a container as described anywhere in the disclosure; spraying a portion of the composition of the container; and then orally consuming the portion of the composition, wherein the subject orally consumes the portion of the composition.

Various aspects of the disclosure relate to a method to administer a cannabinoid to a subject, comprising providing a container as described anywhere in the disclosure; spraying the composition of the container; and then orally consuming the composition, wherein the subject orally consumes the composition.

Various aspects of the disclosure relate to a method to administer a cannabinoid to a subject, comprising providing a container as described anywhere in the disclosure; and spraying a portion of the composition of the container into the mouth of the subject.

Various aspects of the disclosure relate to a method to administer a cannabinoid to a subject, comprising providing a container as described anywhere in the disclosure; and spraying the composition of the container into the mouth of the subject.

Various aspects of the disclosure relate to a method to administer a cannabinoid to a subject, comprising providing a container as described anywhere in the disclosure; and orally administering a portion of the composition of the container to the subject.

Various aspects of the disclosure relate to a method to administer a cannabinoid to a subject, comprising providing a container as described anywhere in the disclosure; and orally administering the composition of the container to the subject.

Various aspects of the disclosure relate to a method to administer a cannabinoid to a subject, comprising providing a composition as described anywhere in the disclosure; spraying a portion of the composition; and then orally consuming the portion of the composition, wherein the subject orally consumes the portion of the composition.

Various aspects of the disclosure relate to a method to administer a cannabinoid to a subject, comprising providing a composition as described anywhere in the disclosure; spraying the composition; and then orally consuming the composition, wherein the subject orally consumes the composition.

Various aspects of the disclosure relate to a method to administer a cannabinoid to a subject, comprising providing a composition as described anywhere in the disclosure; and spraying a portion of the composition into the mouth of the subject.

Various aspects of the disclosure relate to a method to administer a cannabinoid to a subject, comprising providing a composition as described anywhere in the disclosure; and spraying the composition into the mouth of the subject.

Various aspects of the disclosure relate to a method to administer a cannabinoid to a subject, comprising providing a composition as described anywhere in the disclosure; and orally administering a portion of the composition to the subject.

Various aspects of the disclosure relate to a method to administer a cannabinoid to a subject, comprising providing a composition as described anywhere in the disclosure; and orally administering the composition to the subject.

Various aspects of the disclosure relate to a method to treat a health condition in a subject, comprising providing a container as described anywhere in the disclosure; spraying a portion of the composition of the container; and then orally consuming the portion of the composition, wherein the subject orally consumes the portion of the composition.

"Treat" refers to at least one of: to cure a health condition; to increase the probability that a health condition will be cured; to shorten the time over which a health condition is cured; to increase the probability that the time necessary to cure a health condition will be shortened; to decrease the severity of a health condition; to increase the probability that the severity of a health condition will decrease; to shorten the time over which the severity of a health condition is decreased; to increase the probability that the time necessary to decrease the severity of a health condition will be shortened; to inhibit a health condition from worsening; to increase the probability that a health condition will not worsen; to delay the worsening of a health condition; to increase the probability that the worsening of a health condition will be delayed; to inhibit the occurrence or recurrence of a health condition; to decrease the probability that a health condition will occur or reoccur; to delay the onset of a health condition; to increase the probability that the onset of a health condition will be delayed; to alleviate at least one symptom of a health condition; to increase the probability that at least one symptom of a health condition will be alleviated; to shorten the time over which at least one symptom of a health condition is alleviated; to increase the probability that the time necessary to alleviate at least one symptom of a health condition will be shortened; to decrease the severity of at least one symptom of a health condition; to increase the probability that the severity of at least one symptom of a health condition will be decreased; to shorten the time over which the severity of at least one symptom of a health condition is decreased; to increase the probability that the time necessary to decrease the severity of at least one symptom of a health condition will be shortened; to inhibit at least one symptom of a health condition from worsening; to increase the probability that at least one symptom of a health condition will not worsen; to delay the worsening of at least one symptom of a health condition; to increase the probability that the worsening of at least one symptom of a health condition will be delayed; to inhibit at least one symptom of a health condition from occurring or reoccurring; to decrease the probability that at least one symptom of a health condition will occur or reoccur; to delay the onset of at least one symptom of a health condition; and to increase the probability that the onset of at least one symptom of a health condition will be delayed.

Various aspects of the disclosure relate to a method to treat a health condition in a subject, comprising providing a container as described anywhere in the disclosure; spraying the composition of the container; and then orally consuming the composition, wherein the subject orally consumes the composition.

Various aspects of the disclosure relate to a method to treat a health condition in a subject, comprising providing a container as described anywhere in the disclosure; and spraying a portion of the composition of the container into the mouth of the subject.

Various aspects of the disclosure relate to a method to treat a health condition in a subject, comprising providing a container as described anywhere in the disclosure; and spraying the composition of the container into the mouth of the subject.

Various aspects of the disclosure relate to a method to treat a health condition in a subject, comprising providing a container as described anywhere in the disclosure; and orally administering a portion of the composition of the container to the subject.

Various aspects of the disclosure relate to a method to treat a health condition in a subject, comprising providing a container as described anywhere in the disclosure; and orally administering the composition of the container to the subject.

Various aspects of the disclosure relate to a method to treat a health condition in a subject, comprising providing a composition as described anywhere in the disclosure; spraying a portion of the composition; and then orally consuming the portion of the composition, wherein the subject orally consumes the portion of the composition.

Various aspects of the disclosure relate to a method to treat a health condition in a subject, comprising providing a composition as described anywhere in the disclosure; spraying the composition; and then orally consuming the composition, wherein the subject orally consumes the composition.

Various aspects of the disclosure relate to a method to treat a health condition in a subject, comprising providing a composition as described anywhere in the disclosure; and spraying a portion of the composition into the mouth of the subject.

Various aspects of the disclosure relate to a method to treat a health condition in a subject, comprising providing a composition as described anywhere in the disclosure; and spraying the composition into the mouth of the subject.

Various aspects of the disclosure relate to a method to treat a health condition in a subject, comprising providing a composition as described anywhere in the disclosure; and orally administering a portion of the composition to the subject.

Various aspects of the disclosure relate to a method to treat a health condition in a subject, comprising providing a composition as described anywhere in the disclosure; and orally administering the composition to the subject.

In some embodiments, the health condition is type 2 diabetes mellitus; metabolic syndrome; dyslipidemias; cardiovascular disease; hypertension; pre-hypertension; a neurodegenerative disease or neuropathy; mild cognitive impairment; Alzheimer's Disease; Parkinson's Disease; amyotrophic lateral sclerosis ("ALS"); a motor neuron disease; Huntington's disease; an autoimmune disorder; arthritis; ankylosing spondylitis; an inflammatory autoimmune-mediated arthritis; rheumatoid arthritis; osteoarthritis; psoriatic arthritis; psoriasis; plaque psoriasis; lupus; Sjogren's syndrome; inflammatory bowel disease; Crohn's disease; steroid dependent Crohn's disease; ulcerative colitis; graft-versus-host disease; fibrosis; a localized fibrotic disorder; a fibroproliferative disorder; a systemic fibrotic disorder; frozen shoulder; ocular fibrosis; a headache; a migraine headache; an episodic migraine; pain; nociceptive pain; allodynia; chronic pain; intractable pain; back pain; lower back pain; chronic back pain; sciatica; spinal stenosis; acute radicular back pain; chronic radiculopathy; post laminectomy syndrome; post-operative pain; post-operative cognitive dysfunction; post-operative cognitive deficit; post-operative delerium; stomach pain; endometriosis; dysmenorrhea; pelvic pain; visceral pain; musculoskeletal pain; musculoskeletal joint pain; temporomandibular joint pain; myofascial pain; interstitial cystitis; postherpetic neuralgia; sickle cell anemia; sickle cell disease; cancer pain; intractable cancer pain; fibromyalgia; neurogenic pain; neuropathic pain; peripheral neuropathy; diabetic peripheral neuropathy; chemotherapy-induced peripheral neuropathy; inflammatory demyelinating polyneuropathy; allodynia; peripheral pain; hyperalgesia; opioid-induced hyperalgesia; reflex sympathetic dystrophy; residual limb pain; idiopathic pain; psychogenic pain; causalgia; complex regional pain syndrome; complex regional pain syndrome type I; complex regional pain syndrome type II; arthralgia; fatigue; odontalgia; toothache; Dupuytren's contracture; early stage Dupuytren's contracture; gout; hallux valgus; hallux rigidus; epidermolysis bullosa; hemorrhoids; constipation; a urinary stone; bladder pain syndrome; detrusor overactivity; elevated intraocular pressure; glaucoma; retinitis pigmentosa; retinal degeneration; Sturge-Weber syndrome; heart failure; liver disease; fatty liver; non-alcoholic fatty liver disease ("NAFLD"); non-alcoholic steatohepatitis ("NASH"); liver cirrhosis; decompensated cirrhosis; hepatic encephalopathy; hepatitis; hepatitis C; autoimmune hepatitis; nausea; gastroparesis; dyspepsia; Prader-Willi syndrome; cachexia; anorexia; anorexia nervosa; bulimia; vomiting; motion sickness; cancer chemotherapy-induced anorexia; human deficiency virus ("HIV") infection related nausea or cachexia; human deficiency virus ("HIV"); acquired immune deficiency syndrome ("AIDS") related nausea or cachexia; acquired immune deficiency syndrome ("AIDS"); anxiety; generalized anxiety disorder; a specific phobia; agoraphobia; social anxiety disorder; separation anxiety disorder; panic disorder; a panic attack; selective mutism; obsessive-compulsive disorder; depression; treatment resistant depression; a major depressive disorder with psychotic feature(s); psychotic depression; paranoia; psychosis; early psychosis; an unspecified psychosis; an unspecified reactive psychosis; a psychotic disorder; a brief psychotic disorder; a debilitating psychiatric disorder; schizophrenia; schizophreniform disorder; schizoaffective disorder; schizophrenia-related psychotic disorder; dementia; a major neurocognitive disorder with aggressive behavior; paranoid personality disorder; schizoid personality disorder; schizotypal personality disorder; a shared psychotic disorder; a shared paranoia disorder; a delusional disorder; bipolar disorder; bipolar I disorder; bipolar I disorder; bipolar depression; bipolar affective disorder; mania; manic disorder; manic-depressive psychosis; an addiction; an addiction to alcohol or an alcohol use disorder; an addiction to tobacco or a tobacco use disorder; an addiction to nicotine or a nicotine use disorder; an addiction to an opioid or an opioid use disorder; an addiction to a stimulant or a stimulant use disorder; an addiction to cocaine or a cocaine use disorder; an addiction to a prescription drug or a prescription drug use disorder; an addiction to gambling; an addiction to food; an addiction to shopping; an addiction to the internet; an addiction to sex; drug withdrawal or a drug use disorder; alcohol withdrawal syndrome; nicotine withdrawal; opioid withdrawal; cannabis withdrawal; benzodiazepine withdrawal syndrome; antidepressant discontinuation syndrome; antipsychotic withdrawal syndrome; addictive behavior; cannabis use disorder; attention deficit hyperactivity disorder ("ADHD"); autism or an autism spectrum disorder; Asperger syndrome; fragile X syndrome; a pervasive developmental disorder not otherwise specified ("PDD-NOS"); a childhood disintegrative disorder; Tourette's syndrome; Down syndrome; post-traumatic stress disorder ("PTSD"); asthma; respiratory disease; chronic lower respiratory disease; chronic obstructive pulmonary disease ("COPD"); insomnia; sleep apnea; obstructive sleep apnea; or restless legs syndrome; cramping; muscle spasms; spasticity; spasmodic torticollis; a dyskinetic movement disorder; dystonia; intractable spasticity; intractable skeletal muscular spasticity; inclusion body myositis; myasthenia gravis; muscular dystrophy; Duchenne muscular dystrophy; muscle tremor; cerebellar tremor; dystonic tremor; essential tremor; orthostatic tremor; Parkinsonian tremor; physiological tremor; psychogenic tremor; rubral tremor; nystagmus; blepharospasm; a seizure disorder; recurrent focal seizures; recurrent generalized seizures; recurrent absence seizures; recurrent myoclonic-absence seizures; recurrent myoclonus; recurrent myoclonic seizures; recurrent tonic seizures; recurrent tonic-clonic seizures; recurrent atonic seizures; recurrent chronic seizures; epilepsy; recurrent epileptic spasms; recurrent infantile spasms; refractory epilepsy; refractory childhood epilepsy; intractable epilepsy; treatment-resistant epilepsy; drug resistant epilepsy; electrical status epilepticus of sleep; Lennox-Gastaut syndrome; Dravet syndrome; febrile infection related epilepsy syndrome ("FIRES"); juvenile myoclonic epilepsy; childhood absence epilepsy; myoclonic absence seizures ("MAS"); myoclonic astatic epilepsy ("MAE"); tuberous sclerosis complex ("TSC"); Rett syndrome; Angelman syndrome; a neurological condition; stroke; hemorrhagic stroke; ischemic stroke; an ischemic reperfusion injury; epilpetic encephalopathy; neonatal hypoxic-ischemic encephalopathy ("NHIE"); hydrocephalus; hydromyelia; traumatic brain injury ("TBI"); post-concussion syndrome; chronic traumatic encephalopathy; a spinal cord injury; a spinal cord disease; syringomyelia; Tarlov cysts; cystic fibrosis; cerebral palsy; spinocerebellar ataxia; a neural-tube defect; neuropathy; a brain tumor; glioblastoma multiforme; glioblastoma astrocytoma; neurofibromatosis; Arnold-Chiari malformation; multiple sclerosis; a connective tissue disorder; Ehlers-Danlos syndrome; fibrous dysplasia; osteogenesis imperfecta; nail-patella syndrome;

idiopathic pulmonary fibrosis; bone loss; a bone fracture; bone loss caused by a bone fracture; bone loss caused by a surgical procedure; a periodontal defect; periodontal disease; osteopenia; an osteolytic bone disease; osteoporosis; age-related osteoporosis; hormone-related osteoporosis; hypogonadism-related osteoporosis; diabetes-related osteoporosis; glucocorticoid-related osteoporosis; or disuse osteoporosis; a carcinoma; sarcoma; lymphoma; leukemia; germ cell tumor; or blastoma; condition is brain cancer; ovarian cancer; breast cancer; vaginal cancer; vulvar cancer; uterine cancer; cervical cancer; endometrial cancer; prostate cancer; testicular cancer; penile cancer; liver cancer; intrahepatic bile duct cancer; lung cancer; small cell lung cancer; non-small cell lung cancer; bronchial cancer; mesothelioma; pancreatic cancer; gall bladder cancer; non-melanoma skin cancer; melanoma; Kaposi sarcoma; thyroid cancer; head and neck cancer; nasopharyngeal cancer; oropharyngeal cancer; hypopharyngeal cancer; laryngeal cancer; oral cavity cancer; tongue cancer; mouth cancer; salivary gland cancer; esophageal cancer; gastric cancer; colorectal cancer; colon cancer; rectal cancer; anal cancer; kidney cancer; renal cell cancer; renal pelvis cancer; bladder cancer; urethral cancer; Hodgkin lymphoma; non-Hodgkin's lymphoma; myeloma; multiple myeloma; acute lymphocytic leukemia; chronic lymphocytic leukemia; acute myeloid leukemia; chronic myeloid leukemia; osteosarcoma; soft tissue cancer; a severe acute respiratory syndrome coronavirus 2 infection; long COVID; hidradenitis suppurativa; chronic spontaneous urticaria; atopic dermatitis; eczema; acne; male pattern baldness; alpoecia; androgenetic alopecia.

In some embodiments, at least one symptom of the health condition is pain; and the composition is administered to treat pain.

In some embodiments, at least one symptom of the health condition is inflammation; and the composition is administered to treat inflammation.

In some embodiments, at least one symptom of the health condition is anxiety; and the composition is administered to treat anxiety.

In some embodiments, the subject presents with both the health condition and hypertension; hypertension exacerbates the health condition; and the composition is administered to treat the hypertension.

In some embodiments, the subject presents with both the health condition and pre-hypertension; either pre-hypertension or hypertension exacerbates the health condition; and the composition is administered to either treat the pre-hypertension or reduce the risk that the subject will develop hypertension.

In some embodiments, diuretic properties of the cannabinoid treat the health condition.

In some embodiments, the health condition is an autoimmune disease; and the composition is administered to inhibit aberrant immune response in the subject.

In some embodiments, aberrant tumor necrosis factor alpha ("TNF-alpha") signaling either causes or exacerbates the health condition; and the composition is administered to inhibit TNF-alpha-mediated signaling pathways.

In some embodiments, aberrant interferon gamma ("INF-gamma") signaling either causes or exacerbates the health condition; and the composition is administered to inhibit INF-gamma-mediated signaling pathways.

In some embodiments, at least one symptom of the health condition is muscle cramping, spasticity, tremor, or muscle spasms; and the composition is administered to treat the muscle cramping, spasticity, tremor, or muscle spasms.

In some embodiments, at least one symptom of the health condition is seizures; and the composition is administered to treat seizures.

In some embodiments, at least one symptom of the health condition is appetite suppression, nausea, or vomiting; and the composition is administered to treat the appetite suppression, nausea, or vomiting.

In some embodiments, the subject is receiving a primary pharmaceutical agent to treat the health condition; the primary pharmaceutical agent causes appetite suppression, nausea, or vomiting; and the composition is administered to treat the appetite suppression, nausea, or vomiting.

In some embodiments, at least one symptom of the health condition is decreased bone density; and the composition is administered to treat bone loss.

In some embodiments, the health condition is a terminal illness; and the composition is administered to provide palliative care.

In some embodiments, at least 10 milligrams of the liquid phase are administered to the subject. In some embodiments, at least 20 milligrams of the liquid phase are administered to the subject. In some embodiments, at least 40 milligrams of the liquid phase are administered to the subject. In some embodiments, at least 60 milligrams of the liquid phase are administered to the subject. In some embodiments, at least 80 milligrams of the liquid phase are administered to the subject. In some embodiments, at least 100 milligrams of the liquid phase are administered to the subject. In some embodiments, at least 120 milligrams of the liquid phase are administered to the subject. In some embodiments, at least 140 milligrams of the liquid phase are administered to the subject. In some embodiments, at least 160 milligrams of the liquid phase are administered to the subject. In some embodiments, at least 180 milligrams of the liquid phase are administered to the subject. In some embodiments, at least 200 milligrams of the liquid phase are administered to the subject. In some embodiments, at least 300 milligrams of the liquid phase are administered to the subject. In some embodiments, at least 400 milligrams of the liquid phase are administered to the subject. In some embodiments, at least 500 milligrams of the liquid phase are administered to the subject. In some embodiments, at least 600 milligrams of the liquid phase are administered to the subject. In some embodiments, at least 700 milligrams of the liquid phase are administered to the subject. In some embodiments, at least 800 milligrams of the liquid phase are administered to the subject. In some embodiments, at least 900 milligrams of the liquid phase are administered to the subject. In some embodiments, at least 1.0 gram of the liquid phase are administered to the subject. In some embodiments, at least 1.2 grams of the liquid phase are administered to the subject. In some embodiments, at least 1.4 grams of the liquid phase are administered to the subject. In some embodiments, at least 1.6 grams of the liquid phase are administered to the subject. In some embodiments, at least 1.8 grams of the liquid phase are administered to the subject.

In some embodiments, no greater than 5.0 grams of the liquid phase are administered to the subject. In some embodiments, no greater than 4.0 grams of the liquid phase are administered to the subject. In some embodiments, no greater than 3.0 grams of the liquid phase are administered to the subject. In some embodiments, no greater than 2.0 grams of the liquid phase are administered to the subject. In some embodiments, no greater than 1.8 grams of the liquid phase are administered to the subject. In some embodiments, no greater than 1.6 grams of the liquid phase are administered to the subject. In some embodiments, no greater than 1.4 grams of the liquid phase are administered to the subject. In some embodiments, no greater than 1.2 grams of the liquid phase are administered to the subject. In some embodiments, no greater than 1.0 grams of the liquid phase are administered to the subject. In some embodiments, no greater than 900 milligrams of the liquid phase are administered to the subject. In some embodiments, no greater than 800 milligrams of the liquid phase are administered to the subject. In some embodiments, no greater than 700 milligrams of the liquid phase are administered to the subject. In some embodiments, no greater than 600 milligrams of the liquid phase are administered to the subject. In some embodiments, no greater than 500 milligrams of the liquid phase are administered to the subject. In some embodiments, no greater than 400 milligrams of the liquid phase are administered to the subject. In some embodiments, no greater than 300 milligrams of the liquid phase are administered to the subject. In some embodiments, no greater than 200 milligrams of the liquid phase are administered to the subject.

In some embodiments, at least 1 micrograms of the cannabinoid are administered to the subject. In some embodiments, at least 2 micrograms of the cannabinoid are administered to the subject. In some embodiments, at least 4 micrograms of the cannabinoid are administered to the subject. In some embodiments, at least 8 micrograms of the cannabinoid are administered to the subject. In some embodiments, at least 16 micrograms of the cannabinoid are administered to the subject. In some embodiments, at least 32 micrograms of the cannabinoid are administered to the subject. In some embodiments, at least 64 micrograms of the cannabinoid are administered to the subject. In some embodiments, at least 128 micrograms of the cannabinoid are administered to the subject. In some embodiments, at least 256 micrograms of the cannabinoid are administered to the subject. In some embodiments, at least 0.48 milligrams of the cannabinoid are administered to the subject. In some embodiments, at least 0.6 milligrams of the cannabinoid are administered to the subject. In some embodiments, at least 0.7 milligrams of the cannabinoid are administered to the subject. In some embodiments, at least 0.8 milligrams of the cannabinoid are administered to the subject. In some embodiments, at least 0.9 milligrams of the cannabinoid are administered to the subject. In some embodiments, at least 1 milligrams of the cannabinoid are administered to the subject. In some embodiments, at least 2 milligrams of the cannabinoid are administered to the subject. In some embodiments, at least 3 milligrams of the cannabinoid are administered to the subject. In some embodiments, at least 4 milligrams of the cannabinoid are administered to the subject. In some embodiments, at least 5 milligrams of the cannabinoid are administered to the subject. In some embodiments, at least 6 milligrams of the cannabinoid are administered to the subject. In some embodiments, at least 7 milligrams of the cannabinoid are administered to the subject. In some embodiments, at least 8 milligrams of the cannabinoid are administered to the subject. In some embodiments, at least 9 milligrams of the cannabinoid are administered to the subject. In some embodiments, no greater than 100 milligrams of the cannabinoid are administered to the subject. In some embodiments, no greater than 80 milligrams of the cannabinoid are administered to the subject. In some embodiments, no greater than 60 milligrams of the cannabinoid are administered to the subject. In some embodiments, no greater than 40 milligrams of the cannabinoid are administered to the subject. In some embodiments, no greater than 20 milligrams of the cannabinoid are administered to the subject. In some embodiments, no greater than 11 milligrams of the cannabinoid are administered to the subject. In some embodiments, no greater than 9 milligrams of the cannabinoid are administered to the subject. In some embodiments, no greater than 8 milligrams of the cannabinoid are administered to the subject. In some embodiments, no greater than 7 milligrams of the cannabinoid are administered to the subject. In some embodiments, no greater than 6 milligrams of the cannabinoid are administered to the subject. In some embodiments, no greater than 5 milligrams of the cannabinoid are administered to the subject. In some embodiments, no greater than 4 milligrams of the cannabinoid are administered to the subject. In some embodiments, no greater than 3 milligrams of the cannabinoid are administered to the subject. In some embodiments, no greater than 2 milligrams of the cannabinoid are administered to the subject. In some embodiments, no greater than 1.2 milligrams of the cannabinoid are administered to the subject.

In preferred embodiments related to health conditions, a therapeutically effective amount of the cannabinoid is administered to the subject.

In some embodiments, the subject is a mammal.

In some embodiments, the subject is a rodent. In some embodiments, the subject is a lagomorph. In some embodiments, the subject is a feline. In some embodiments, the subject is a canine. In some embodiments, the subject is a porcine. In some embodiments, the subject is an ovine. In some embodiments, the subject is a caprine. In some embodiments, the subject is a vicugna. In some embodiments, the subject is a bovine. In some embodiments, the subject is an equine. In some embodiments, the subject is a primate.

In some embodiments, the subject is a human.

In some embodiments, the administering produces a T max, which is the time it takes to achieve a maximum blood concentration of the cannabinoid in the subject following the administering; and the T max is no greater than 30 minutes. In some embodiments, the T max is no greater than 25 minutes. In some embodiments, the T max is no greater than 20 minutes. In some embodiments, the T max is no greater than 15 minutes. In some embodiments, the T max is no greater than 10 minutes. In some embodiments, the T max is no greater than 5 minutes.

In some embodiments, an administered amount of the cannabinoid is administered to the subject during the administering; the subject has blood; a bioavailable amount of the cannabinoid enters the blood of the subject following the administering; the composition has an oral bioavailability, which is equal to the bioavailable amount divided by the administered amount; and the oral bioavailability is at least 5 percent. In some embodiments, the oral bioavailability is at least 10 percent. In some embodiments, the oral bioavailability is at least 15 percent. In some embodiments, the oral bioavailability is at least 20 percent. In some embodiments, the oral bioavailability is at least 25 percent. In some embodiments, the oral bioavailability is at least 30 percent. In some embodiments, the oral bioavailability is at least 35 percent. In some embodiments, the oral bioavailability is at least 40 percent. In some embodiments, the oral bioavailability is at least 45 percent. In some embodiments, the oral bioavailability is at least 50 percent.

Any of the features of the specification can be combined as grammar, mathematics, and logic allow, and specific combinations are set forth by the multiple dependency of the original claims. The fact that some combinations of features of the specification and/or original claims might create grammatical, mathematical, or logical inconsistencies (such as the combination of ingredients at percentages that sum to greater than 100 percent) shall not be used to discount other combinations of features of the specification and/or original claims that maintain grammatical, mathematical, and logical consistency.

What is claimed is:

1. A composition, comprising (a) a liquid phase that consists of chemical species that comprise a solvent and solutes and (b) a gas phase, wherein:
the liquid phase is a dispersed phase;
the gas phase is a dispersion medium;
the liquid phase is suspended in the gas phase;
the composition is a spray;
the composition comprises at least 40 milligrams and no greater than 300 milligrams of the liquid phase;
each solute of the solutes is dissolved in the solvent of the liquid phase;
each chemical species of the liquid phase has a concentration by mass in the liquid phase;
the concentration by mass of the solvent in the liquid phase is greater than the concentration by mass of each solute of the liquid phase;
the solvent is glycerol;
the solutes comprise a cannabinoid;
the liquid phase has a pressure and temperature;
the cannabinoid has a solubility in glycerol at the pressure and temperature;
the concentration by mass of the cannabinoid in the liquid phase is greater than the solubility of the cannabinoid in glycerol at the pressure and temperature;
the composition is formulated for oral consumption;
the composition comprises at least 0.16 and no greater than 1.8 food calories; and
the composition comprises at least 0.1 and no greater than 6 food calories per gram of the composition.

2. The composition of claim 1, wherein the concentration of the cannabinoid in the liquid phase is at least 0.1 percent and no greater than 4 percent by mass.

3. The composition of claim 1, wherein the concentration of the glycerol in the liquid phase is at least 35 percent and no greater than greater 90 by mass.

4. The composition of claim 1, wherein the concentration of the cannabinoid in the liquid phase is at least 100 times greater than the solubility of the cannabinoid in glycerol at the pressure and temperature.

5. The composition of claim 1, wherein:
the liquid phase comprises propylene glycol at a concentration of at least 5 percent and no greater than 20 percent by mass; and
the propylene glycol is a solute that is dissolved in the glycerol.

6. The composition of claim 1, wherein the liquid phase lacks propylene glycol.

7. The composition of claim 1, wherein:
the liquid phase comprises ethanol at a concentration of at least 5 percent and no greater than 35 percent by mass; and
the ethanol is a solute that is dissolved in the glycerol.

8. The composition of claim 1, wherein the liquid phase lacks ethanol.

9. The composition of claim 1, wherein:
the liquid phase comprises water at a concentration of at least 5 parts per million and no greater than 15 percent by mass; and
the water is a solute that is dissolved in the glycerol.

10. The composition of claim 1, wherein the liquid phase lacks water.

11. The composition of claim 1, wherein the cannabinoid is tetrahydrocannabinol.

12. The composition of claim 1, wherein:
the liquid phase comprises the glycerol at a concentration of at least 45 percent and no greater than 65 percent by mass;
the liquid phase comprises propylene glycol at a concentration of at least 5 percent and no greater than 20 percent by mass;
the liquid phase comprises ethanol at a concentration of at least 5 percent and no greater than 35 percent by mass;
the liquid phase comprises water at a concentration of at least of at least 5 parts per million and no greater than 15 percent by mass; and
the liquid phase comprises the cannabinoid at a concentration of at least 0.2 percent and no greater than 2 percent by mass.

13. The composition of claim 1, comprising at least 0.48 and no greater than 2.1 milligrams of the cannabinoid.

14. The composition of claim 1, wherein the composition is an aerosol.

15. The composition of claim 1, wherein the cannabinoid is 3-pentyl-6,6,9-trimethyl-6a,7,8,10a-tetrahydro-6H-benzo[c]chromene-1-ol.

16. The composition of claim 1, wherein the cannabinoid is 3-pentyl-6,6,9-trimethyl-6a,7,8, 10a-tetrahydro-6H-benzo[c]chromene-1-oxide.

17. The composition of claim 1, wherein the cannabinoid is cannabidiol.

18. The composition of claim 1, wherein the cannabinoid is delta8-tetrahydrocannabinol.

19. The composition of claim 1, wherein the cannabinoid is cannabigerol.

20. The composition of claim 1, wherein the cannabinoid is tetrahydrocannabivarin.

* * * * *